US012154516B2

(12) United States Patent
Lee et al.

(10) Patent No.: US 12,154,516 B2
(45) **Date of Patent: *Nov. 26, 2024**

(54) DISPLAY PANEL AND DISPLAY DEVICE USING THE SAME

(71) Applicant: LG DISPLAY CO., LTD., Seoul (KR)

(72) Inventors: Hyun Suk Lee, Gyeonggi-do (KR); Seung Taek Oh, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,538

(22) Filed: Jul. 7, 2023

(65) Prior Publication Data

US 2023/0351973 A1 Nov. 2, 2023

Related U.S. Application Data

(63) Continuation of application No. 17/494,353, filed on Oct. 5, 2021, now Pat. No. 11,741,910.

(30) Foreign Application Priority Data

Nov. 3, 2020 (KR) ........................ 10-2020-0145199

(51) Int. Cl.
*G09G 3/3233* (2016.01)
*G09G 3/3266* (2016.01)
*G09G 3/3291* (2016.01)

(52) U.S. Cl.
CPC ......... *G09G 3/3291* (2013.01); *G09G 3/3266* (2013.01); *G09G 2310/0297* (2013.01);
(Continued)

(58) Field of Classification Search
CPC ............... G09G 3/3266; G09G 3/3674; G09G 2340/0407; G09G 2320/0673;
(Continued)

(56) References Cited

U.S. PATENT DOCUMENTS 11,741,910 B2 * 8/2023 Lee ...................... G09G 3/3291 345/690
2010/0066655 A1 3/2010 Uh et al.
(Continued)

FOREIGN PATENT DOCUMENTS

CN 1811865 A 8/2006
CN 107238989 A 10/2017
(Continued)

OTHER PUBLICATIONS

Office Action issued Dec. 18, 2023 for Chinese Patent Application No. CN 202111142802.2 (See English Translation).
(Continued)

*Primary Examiner* — Xuemei Zheng

(74) *Attorney, Agent, or Firm* — Morgan, Lewis & Bockius LLP

(57) ABSTRACT

The present disclosure relates to a display panel and a display device using the same. The display panel includes a pixel array in which a plurality of data lines, a plurality of gate lines crossing the data lines, and a plurality of pixels are disposed; a first gate driver configured to supply a gate signal to gate lines connected to pixels disposed in a first area of the pixel array; and a second gate driver configured to receive a carry signal from the first gate driver and supply a gate signal to gate lines connected to pixels disposed in a second area of the pixel array. The second gate driver includes a signal transmission unit disposed in the pixel array to receive the carry signal from the first gate driver.

18 Claims, 21 Drawing Sheets

(52) U.S. Cl.
CPC . *G09G 2310/08* (2013.01); *G09G 2320/0673* (2013.01); *G09G 2340/0407* (2013.01); *G09G 2360/14* (2013.01)

(58) Field of Classification Search
CPC ......... G09G 2320/0233; G09G 3/3291; G09G 2310/0297; G09G 2310/08; G09G 2320/673
See application file for complete search history.

(56) References Cited

U.S. PATENT DOCUMENTS

| | | | |
|---|---|---|---|
| 2015/0253924 A1 | 9/2015 | Park et al. | |
| 2016/0307517 A1 | 10/2016 | Park et al. | |
| 2017/0061839 A1 | 3/2017 | Park et al. | |
| 2017/0337877 A1 | 11/2017 | Kim et al. | |
| 2018/0151125 A1 | 5/2018 | Lee | |
| 2018/0190202 A1* | 7/2018 | Kong | G09G 3/002 |
| 2020/0013846 A1 | 1/2020 | Kwon et al. | |
| 2020/0135147 A1* | 4/2020 | Tang | G09G 5/10 |
| 2021/0104203 A1* | 4/2021 | Ueno | G09G 3/3677 |
| 2021/0134242 A1* | 5/2021 | Hei | G09G 5/02 |
| 2021/0158750 A1 | 5/2021 | Xiang et al. | |
| 2021/0367122 A1 | 11/2021 | Park et al. | |
| 2022/0139331 A1* | 5/2022 | Jang | G09G 3/3275 345/55 |

FOREIGN PATENT DOCUMENTS

| | | | |
|---|---|---|---|
| CN | 107403605 | A | 11/2017 |
| CN | 108962968 | A | 12/2018 |
| CN | 109192138 | A | 1/2019 |
| CN | 110189706 | A | 8/2019 |
| CN | 110767157 | A | 2/2020 |
| KR | 10-2006-0067289 | A | 6/2006 |
| KR | 10-2017-0026692 | A | 3/2017 |
| KR | 10-2018-0077804 | A | 7/2018 |
| KR | 10-1872987 | B1 | 7/2018 |

OTHER PUBLICATIONS

Office Action issued Apr. 15, 2024 for Korean Patent Application No. 10-2020-0145199 (See English Translation).
Office Action issued Jul. 9, 2024 for Chinese Patent Application No. 202111142802.2 (See English Translation) (Note: CN 109192138 A & CN 107238989 A were cited in a prior IDS.).

* cited by examiner

DISPLAY PANEL AND DISPLAY DEVICE USING THE SAME

CROSS-REFERENCE TO RELATED APPLICATIONS

This application is a continuation of U.S. patent application Ser. No. 17/494,353, filed on Oct. 5, 2021, which claims priority to and the benefit of Korean Patent Application No. 10-2020-0145199, filed Nov. 3, 2020, the disclosure of each of which is incorporated herein by reference in its entirety.

BACKGROUND

1. Technical Field

The present disclosure relates to a display panel in which an image is reproduced in a pixel array, and a display device using the same.

2. Discussion of the Related Art

Electroluminescent display devices are roughly classified into inorganic light emitting display devices and organic light emitting display devices depending on the material of an emission layer. The organic light emitting display device of an active matrix type includes an organic light emitting diode (hereinafter, referred to as "OLED") that emits light by itself, and has an advantage in that the response speed is fast and the luminous efficiency, luminance, and viewing angle are large. In the organic light emitting display device, the OLED is formed in each pixel. The organic light emitting display device has a fast response speed, excellent luminous efficiency, luminance, and viewing angle, and has excellent contrast ratio and color reproducibility since it can express black gradations in complete black.

Multi-media functions of mobile terminals have been improved. For example, a camera is built into a smartphone by default, and the resolution of the camera is increasing to the level of a conventional digital camera. A front camera of the smartphone restricts a screen design, making it difficult to design the screen. In order to reduce a space occupied by the camera, a screen design including a notch or punch hole has been adopted in the smartphone, but the screen size is still limited due to the camera, making it impossible to implement a full-screen display.

SUMMARY

In order to implement a full-screen display, a camera module may be disposed to overlap the screen of a display panel. Some display areas of the screen overlapping the camera module may increase their transmittance by lowering the resolution or pixels per inch (PPI) compared to other normal display areas. In this case, a luminance difference may occur between some display areas in which the camera module is disposed and the normal display areas. In order to solve this problem, the luminance difference may be reduced by setting a data voltage differently between the areas of the screen, i.e., the pixel array, but there may be differences in grayscale expression power for each area and the grayscale expression power may be deteriorated. In addition, in order to set the data voltage differently for each area of the pixel array, the gamma compensation voltage is independently set for each area using a plurality of programmable gamma ICs (P-GMA IC), and accordingly, the circuit cost is increased.

Accordingly, embodiments of the present disclosure are directed to a display panel and a display device using the same that substantially obviate one or more of the problems due to limitations and disadvantages of the related art.

An aspect of the present disclosure is to solve or reduce the above-mentioned needs and/or problems.

An aspect of the present disclosure is to provide a display panel capable of realizing a full-screen display and uniform luminance across the entire the full-screen display, and a display device using the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display panel comprises: a pixel army in which a plurality of data lines, a plurality of gate lines crossing the data lines, and a plurality of pixels are disposed; a first gate driver configured to supply a gate signal to gate lines connected to pixels disposed in a first area of the pixel array; and a second gate driver configured to receive a carry signal from the first gate driver and supply a gate signal to gate lines connected to pixels disposed in a second area of the pixel array. The second gate driver includes a signal transmission unit disposed in the pixel array to receive the carry signal from the first gate driver.

A resolution or pixels per inch (PPI) of the first and second areas may be different from each other. For example, the resolution or PPI of the second area may be lower than that of the first area.

In another aspect, a display device comprises: a display panel including a pixel array in which a plurality of data lines, a plurality of gate lines crossing the data lines, and a plurality of pixels are disposed; a data voltage control unit configured to output first voltage control data for controlling a dynamic range of a data voltage applied to pixels disposed in a first area of the pixel array during a first scanning period in which the first area is scanned, and output second voltage control data for controlling a dynamic range of a data voltage applied to pixels disposed in a second area of the pixel army during a second scanning period in which the second area is scanned; a gamma compensation voltage generator configured to output a first gamma compensation voltage in response to the first voltage control data during the first scanning period of the first area, and output a second gamma compensation voltage in response to the second voltage control data during the second scanning period of the second area, a data driver configured to, during the first scanning period, convert pixel data into the first gamma compensation voltage to output a data voltage to be supplied to the pixels disposed in the first area, and during the second scanning period, convert pixel data into the second gamma compensation voltage to output a data voltage to be supplied to the pixels disposed in the second area; a first gate driver configured to supply a gate signal to gate lines connected to the pixels disposed in the first area during the first scanning period; and a second gate driver configured to receive a carry signal from the first gate driver and supply a gate signal to gate lines connected to the pixels disposed in the second area during the second scanning period.

According to the present disclosure, since a sensor is disposed in a screen on which an image is displayed, a full-screen display may be realized.

According to the present disclosure, the gamma compensation voltage outputted from the gamma compensation voltage generator is individually controlled for each of the first area (high PPI area) and second area (low PPI area) to control the dynamic range of the data voltage applied to the pixels of the low PPI area to be larger than that of the data voltage applied to the pixels of the high PPI area. As a result, in the present disclosure, a luminance difference between the high PPI area and the low PPI area may be reduced of minimized to realize uniform luminance characteristics over the entire screen.

Further, according to the present disclosure, the dynamic range of the data voltage may be differently controlled for each area of the pixel array by using one programmable gamma IC.

According to the present disclosure, the luminance difference between the areas having different PPIs may be reduced by increasing a voltage range of the data voltage applied to the low PPI area or increasing a channel ratio of a driving element disposed in the pixels of the low PPI area.

According to the present disclosure, an increase in a bezel area of the display panel may be reduced or minimized without lowering the transmittance of the low PPI area, by dispersedly arranging, in the pixel array, at least some of circuit elements constituting the gate driver for driving the gate lines of the low PPI area.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1A:
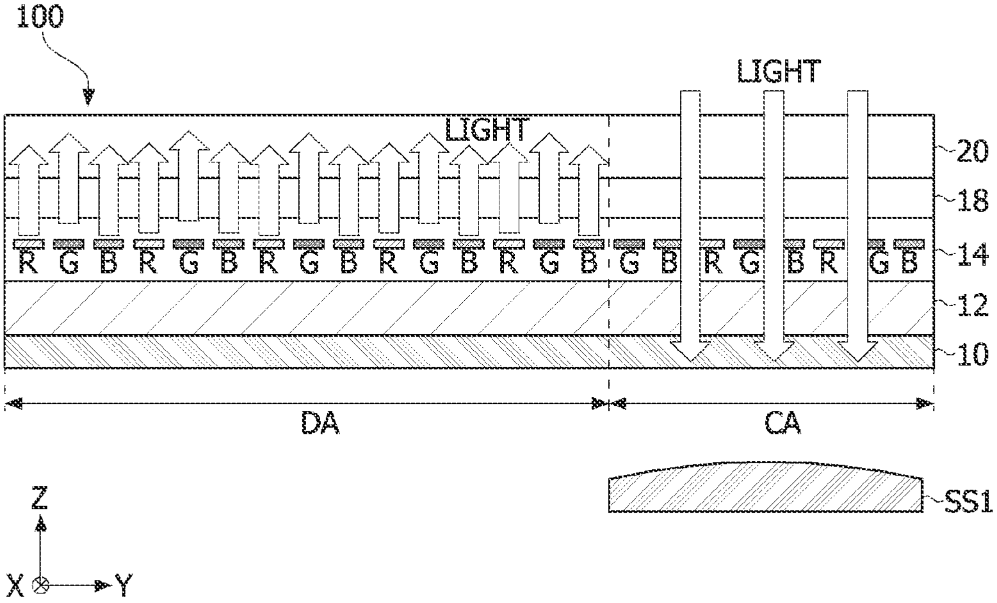
FIGS. 1A and 1B are cross-sectional views schematically showing a display panel according to an embodiment of the present disclosure.

Advantages and features of the present disclosure, and a method of achieving them will become apparent with reference to the embodiments described below in detail together with the accompanying drawings. However, the present disclosure is not limited to the embodiments disclosed below, but will be implemented in a variety of different forms. However, the present embodiments are provided to complete the present disclosure, and to fully inform the scope of the disclosure to those of ordinary skill in the art to which the present disclosure pertains, and the present disclosure is only defined by the scope of the claims.

The shapes, sizes, ratios, angles, numbers, and the like disclosed in the drawings for explaining the embodiments of the present disclosure are exemplary, and thus the present disclosure is not limited to the illustrated matters. The same reference numerals used herein refer to the same components. In addition, in describing the present disclosure, when it is determined that a detailed description of a related known technique may unnecessarily obscure the subject matter of the present disclosure, the detailed description thereof will be omitted.

When terms such as “include”, “have”, and “consist of” are used herein, other parts may be added unless “only” is used. In the case of expressing the components in the singular, it includes the case of including the plural unless specifically stated otherwise.

In interpreting the components, it is interpreted as including an error range even if there is no explicit description.

In the case of a description of the positional relationship, for example, if the positional relationship of two parts is described as terms such as “on ~”, “above ~”, “below ~”, and “beside ~”, one or more other parts may be located between the two parts unless “right”, or “directly” is used.

In the description of the embodiments, first, second, and the like are used to describe various components, but these components are not limited by these terms. These terms are only used to distinguish one component from another component. Accordingly, a first component mentioned below may be a second component within the technical spirit of the present disclosure.

The same reference numerals used herein refer to the same components.

Features of the various embodiments may be partially or entirely coupled or combined with each other, various interlocking and driving are technically possible, and the embodiments may be implemented independently of each other or may be implemented together in a related relationship.

In a display device of the present disclosure, a pixel circuit and a gate driver may include a plurality of transistors. The transistors may be implemented as an oxide thin film transistor (TFT) including an oxide semiconductor, a low temperature polysilicon (LTPS) TFT including the LTPS, or the like. Each of the transistors may be implemented as a p-channel TFT or an n-channel TFT.

The transistor is a three-electrode element including a gate, a source, and a drain. The source is an electrode that supplies carriers to the transistor. In the transistor, the carriers start flowing from the source. The drain is an electrode through which the carriers exit from the transistor. In the transistor, the carriers flow from the source to the drain. In the case of an n-channel transistor, since the carriers are electrons, a source voltage is lower than a drain voltage so that the electrons can flow from the source to the drain. In the n-channel transistor, a current flows from the drain to the source. In the case of a p-channel transistor (PMOS), since the carriers are holes, the source voltage is higher than the drain voltage so that the holes can flow from the source to the drain. In the p-channel transistor, since the holes flow from the source to the drain, a current flows from the source to the drain. It should be noted that the source and drain of the transistor are not fixed. For example, the source and the drain may be changed according to an applied voltage. Therefore, the present disclosure is not limited due to the source and drain of the transistor. In the following description, the source and drain of the transistor will be referred to as first and second electrodes.

A gate signal swings between a gate-on voltage and a gate-off voltage. The gate-on voltage is set to a voltage higher than the threshold voltage of the transistor, and the gate-off voltage is set to a voltage lower than the threshold voltage of the transistor. The transistor is turned on in response to the gate-on voltage, while it is turned off in response to the gate-off voltage. In the case of the n-channel transistor, the gate-on voltage may be a gate high voltage VGH and VEH, and the gate-off voltage may be a gate low voltage VGL and VEL. In the case of the p-channel transistor, the gate-on voltage may be the gate low voltage VGL and VEL, and the gate-off voltage may be the gate high voltage VGH and VEH.

Hereinafter, various embodiments of the present disclosure will be described in detail with reference to the accompanying drawings.

Figure 2:
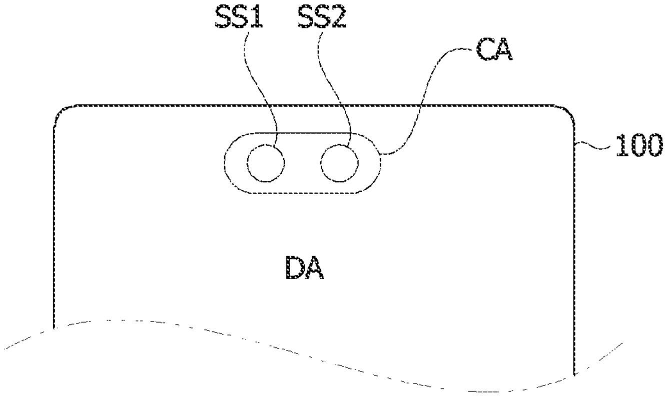
FIG. 2 is a plan view showing an area in which a sensor module is disposed in a screen of a display panel.

Referring to FIGS. 1A and 2, a screen of a display panel 100 according to an embodiment of the present disclosure includes a pixel array that reproduces an input image. The pixel array includes first and second areas DA and CA having different resolutions or pixels per inch (PPI).

The first area DA is a main display area that occupies most of the screen. In the second area CA, pixels are arranged with PPI lower than that of the first area DA and display pixel data.

One or more sensor modules SS1 and SS2 may be disposed in the lower portion of the rear surface of the display panel 100. The sensor modules SS1 and SS2 face the second area CA. The sensor modules SS1 and SS2 may include various sensors such as, for example, an imaging module (or camera module) including an image sensor, an infrared sensor module, and an illuminance sensor module. The sensor modules SS1 and SS2 photoelectrically convert light received through the second area CA to output an electric signal. An image may be obtained from the output signals of the sensor modules SS1 and SS2. The second area CA may include a light transmitting portion disposed at a part secured by lowering the PPI in order to increase the transmittance of light directed to the sensor modules SS1 and SS2.

Since the first area DA and the second area CA include pixels, the input image may be displayed in the first area DA and the second area CA.

Figure 1B:
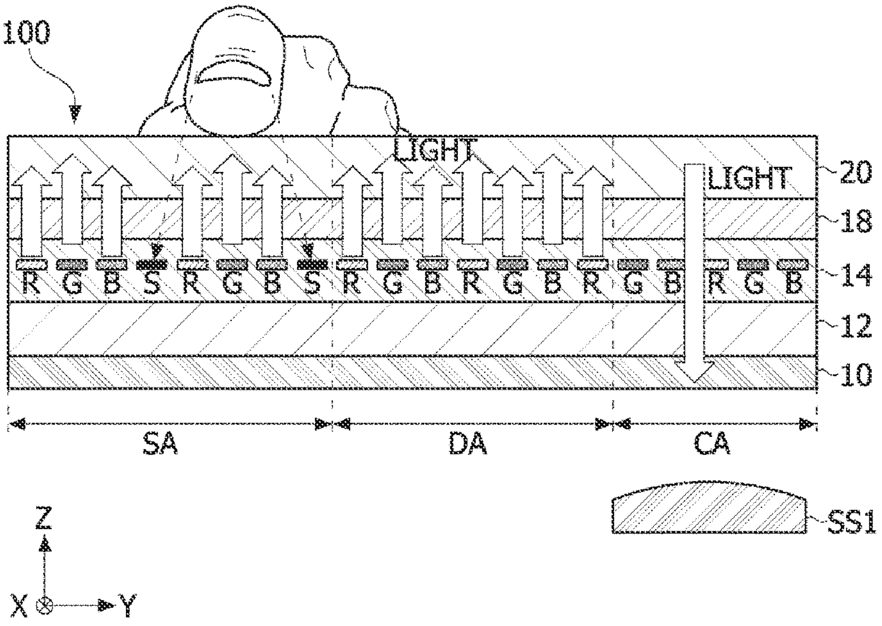

The pixel array may further include a third area SA as shown in FIG. 1B. The resolution or PPI of display pixels in the third area SA may be lower than that of the first area DA and may be the same as or different from that of the second area CA. The third area SA displays pixel data in a display mode. In the third area SA, a user's fingerprint is sensed using a photo sensor S in a fingerprint recognition mode. Pixels R, G. and B of the third area SA and the photo sensor S may share at least some of signal lines and power lines. Herein, for the sake of convenience, the areas DA, CA, and SA of the pixel array may be simply referred to as "pixel array DA, CA, and SA".

Each of the pixels of the pixel array DA, CA, and SA includes sub-pixels having different colors to reproduce a color of an image. The sub-pixels include a red sub-pixel (hereinafter referred to as "R sub-pixel"), a green sub-pixel (hereinafter referred to as "G sub-pixel"), and a blue sub-pixel (hereinafter referred to as "B sub-pixel"). Although not shown, each of the pixels may further include a white sub-pixel (hereinafter referred to as "W sub-pixel"). Each of the sub-pixels may include a pixel circuit that drives a light emitting element.

An image quality compensation algorithm for compensating the luminance and color coordinates of pixels may be applied into the second and third areas CA and SA having PPI lower than that of the first area DA.

In the display device of the present disclosure, since the sensor module is disposed in the second area CA and the photo sensor is embedded in the pixel array of the third area SA, a full-screen display may be realized.

The display panel 100 has a width in an X-axis direction, a length in a Y-axis direction, and a thickness in a Z-axis direction. The display panel 100 may include a circuit layer 12 disposed on a substrate 10 and a light emitting element layer 14 disposed on the circuit layer 12. A polarizing plate 18 may be disposed on the light emitting element layer 14, and a cover glass 20 may be disposed on the polarizing plate 18.

The circuit layer 12 may include a pixel circuit connected to wires such as data lines, gate lines, and power lines, and a gate driver connected to the gate lines. The circuit layer 12 may include transistors implemented as thin film transistors (TFT) and circuit elements such as capacitors. The wires and circuit elements of the circuit layer 12 may be implemented with a plurality of insulating layers, two or more metal layers separated with the insulating layer interposed therebetween, and an active layer including a semiconductor material.

The light emitting element layer 14 may include a light emitting element driven by a pixel circuit. The light emitting element may be implemented with an OLED. The OLED includes an organic compound layer formed between an anode and a cathode. The organic compound layer may include a hole injection layer HIL, a hole transport layer HTL, an emission layer EML, an electron transport layer ETL, and an electron injection layer EIL, but is not limited thereto. When a voltage is applied to the anode and cathode of the OLED, holes that have passed through the hole transport layer HTL and electrons that have passed through the electron transport layer ETL move to the emission layer EML to form excitons, and as a result, visible light is emitted from the emission layer EML. The light emitting element layer 14 may be disposed on pixels that selectively transmit red, green, and blue wavelengths and may further include a color filter array.

The light emitting element layer 14 may be covered with a passivation layer, and the passivation layer may be covered with an encapsulation layer. The passivation layer and the encapsulation layer may have a structure in which an organic film and an inorganic film are alternately stacked. The inorganic film blocks the penetration of moisture or oxygen. The organic film flattens the surface of the inorganic film. When the organic film and the inorganic film are stacked in multiple layers, the movement path of moisture or oxygen becomes longer than that in a single layer, so that the penetration of moisture/oxygen affecting the light emitting element layer 14 may be effectively blocked.

The polarizing plate 18 may be adhered to the encapsulation layer. The polarizing plate 18 improves outdoor visibility of the display device. The polarizing plate 18 reduces light reflected from the surface of the display panel 100 and blocks light reflected from the metal of the circuit layer 12 to improve brightness of the pixels. The polarizing plate 18 may be implemented as a polarizing plate in which a linear polarizing plate and a phase delay film are bonded, or a circular polarizing plate.

Figure 3:
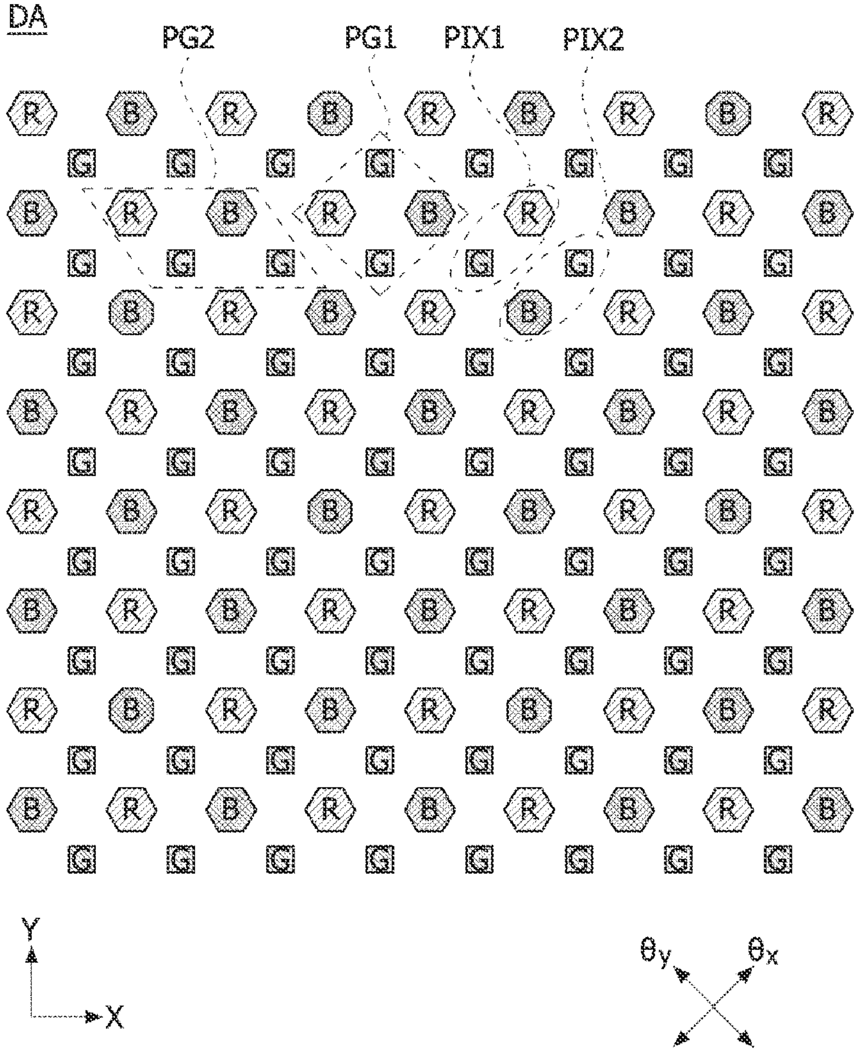
FIG. 3 is a diagram showing a pixel arrangement in a high PPI area.
Figure 4:
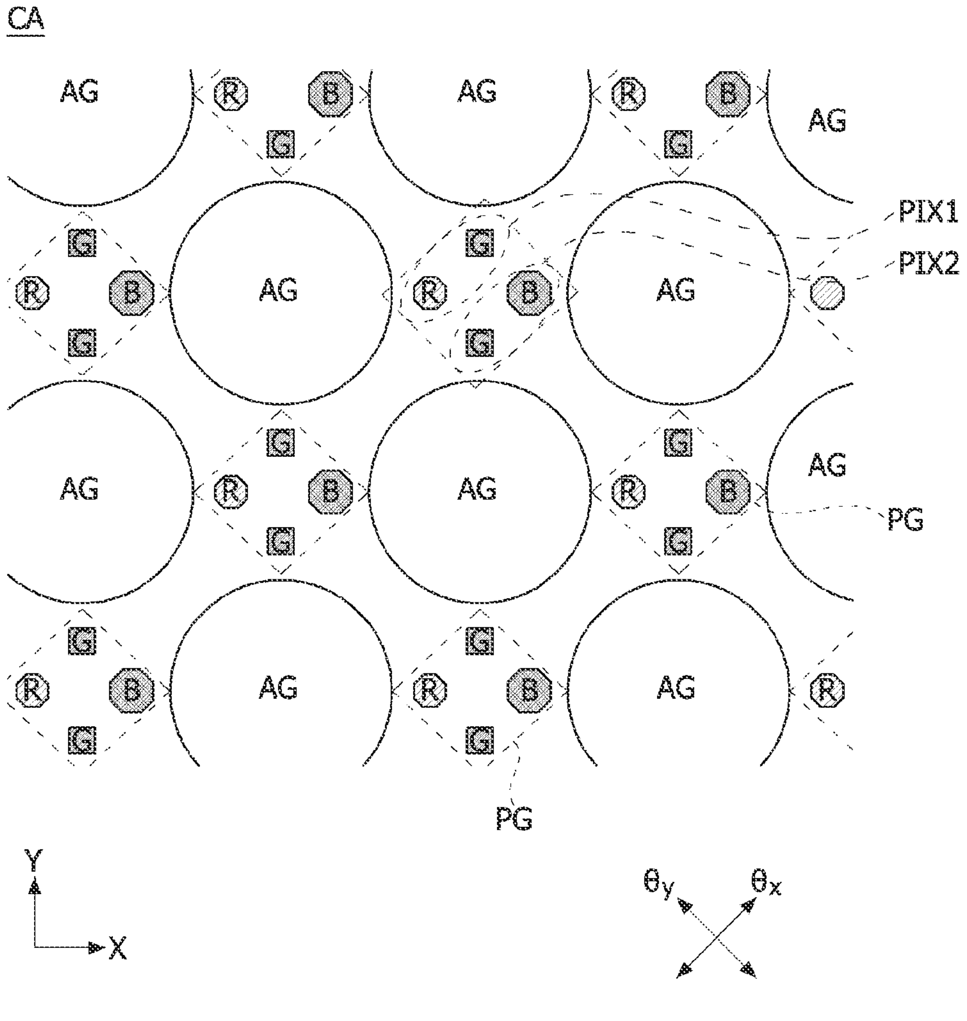
FIG. 4 is a diagram illustrating a pixel arrangement in a low PPI area.

FIG. 3 is a diagram illustrating an example of pixel arrangement in a high PPI area. FIG. 4 is a diagram illustrating an example of pixels in a low PPI area and a light transmitting portion. In FIGS. 3 and 4, wires connected to the pixels are omitted.

Referring to FIG. 3, the first area DA includes pixels PIX1 and PIX2 arranged with high PPI. Each of the pixels PIX1 and PIX2 may be implemented as a real type pixel in which R, G, and B sub-pixels of three primary colors constitute one pixel. Each of the pixels PIX1 and PIX2 may further include a W sub-pixel omitted from the drawing.

Each of the pixels may be composed of two sub-pixels using a sub-pixel rendering algorithm. For example, a first pixel PIX1 may be composed of an R sub-pixel and a first G sub-pixel, and a second pixel PIX2 may be composed of a B sub-pixel and a second G sub-pixel. Insufficient color representation in each of the first and second pixels PIX1 and PIX2 may be compensated by an average value of corresponding color data between neighboring pixels. White color may be expressed by combining the R, G, and B sub-pixels of the first and second pixels PIX1 and PIX2.

The pixels in the first area DA may be defined as unit pixel groups PG1 and PG2 having a predetermined size. The unit pixel groups PG1 and PG2 are pixel areas of the predetermined size including four sub-pixels. The unit pixel groups PG1 and PG2 are repeatedly arranged in a first direction (X-axis), in a second direction (Y-axis) perpendicular to the first direction, and in an inclined direction (θx and θy axes) between the first and second directions. θx and θy denote the directions of the inclined axes formed by rotating the X-axis and Y-axis by 45°, respectively.

The unit pixel groups PG1 and PG2 may be a parallelogram-shaped pixel area PG1 or a rhombus-shaped pixel area PG2. The unit pixel groups PG1 and PG2 should be interpreted as including a rectangular shape, a square shape, and the like.

The sub-pixels of the unit pixel groups PG1 and PG2 include a sub-pixel of a first color, a sub-pixel of a second color, and a sub-pixel of a third color, in which two sub-pixels of any one of the first to third color sub-pixels are included. For example, the unit pixel groups PG1 and PG2 may include one R sub-pixel, two G sub-pixels, and one B sub-pixel. In the sub-pixels in the unit pixel groups PG1 and PG2, the luminous efficiency of the light emitting element may be different for each color. In consideration of this, the size of the sub-pixels may vary for each color. For example, among the R. G, and B sub-pixels, the B sub-pixel may be the largest and the G sub-pixel may be the smallest.

Referring to FIG. 4, the second area CA includes pixel groups PG spaced apart by a predetermined distance and light transmitting portions AG disposed between the neighboring pixel groups PG. External light is received by the lens of the sensor module through the light transmitting portions AG. The light transmitting portions AG may include transparent media having high transmittance without metal so that light is able to be incident with minimal light loss. In other words, the light transmitting portions AG may be formed of transparent insulating materials without including metal wires or pixels. The PPI of the second area CA is lower than that of the first area DA due to the light transmitting portions AG.

The pixel group PG of the second area CA may include one or two pixels. Each pixel of the pixel group may include two to four sub-pixels. For example, one pixel in the pixel group may include R, G, and B sub-pixels or may include two sub-pixels, and further a W sub-pixel. In the example of FIG. 4, a first pixel PIX1 is composed of R and G sub-pixels, and a second pixel PIX2 is composed of B and G sub-pixels, but the present disclosure is not limited thereto.

The first and second pixels PIX1 and PIX2 may be disposed in the pixel group PG disposed in the second area. The first pixel PIX1 may be composed of an R sub-pixel and a first G sub-pixel, and the second pixel PIX2 may be composed of a B sub-pixel and a second G sub-pixel. Insufficient color representation in each of the first and second pixels PIX1 and PIX2 may be compensated by an average value of corresponding color data between neighboring pixels. White color may be expressed by combining the R, G, and B sub-pixels of the first and second pixels PIX1 and PIX2.

The shape of the light transmitting portions AG is illustrated to be circular in FIG. 4, but is not limited thereto. For example, the light transmitting portions AG may be designed in various shapes such as a circle, an ellipse, and a polygon.

Due to process deviation and element properties deviation caused in the manufacturing process of the display panel, there may be a difference in the electrical properties of a driving element between pixels, and this difference may be increased as the driving time of the pixels elapses. In order to compensate for deviation in the electrical properties of the driving element between pixels, an internal compensation technique or an external compensation technique may be applied to an organic light emitting display device. In the internal compensation technique, an internal compensation circuit implemented in each pixel circuit is used to sense a threshold voltage of the driving element for each sub-pixel, and compensate a gate-source voltage Vgs of the driving element by the threshold voltage. In the external compensation technique, an external compensation circuit is used to sense in real time a current or voltage of the driving element that varies depending on the electrical properties of the driving elements. The external compensation technique modulates pixel data (digital data) of an input image as much as the deviation in the electrical properties (or variation) of the driving element sensed for each pixel, thereby compensating the electrical properties deviation (or variation) of the driving element in each of the pixels in real time. A display panel driver may drive the pixels using the external compensation technique and/or the internal compensation technique.

Figure 5:
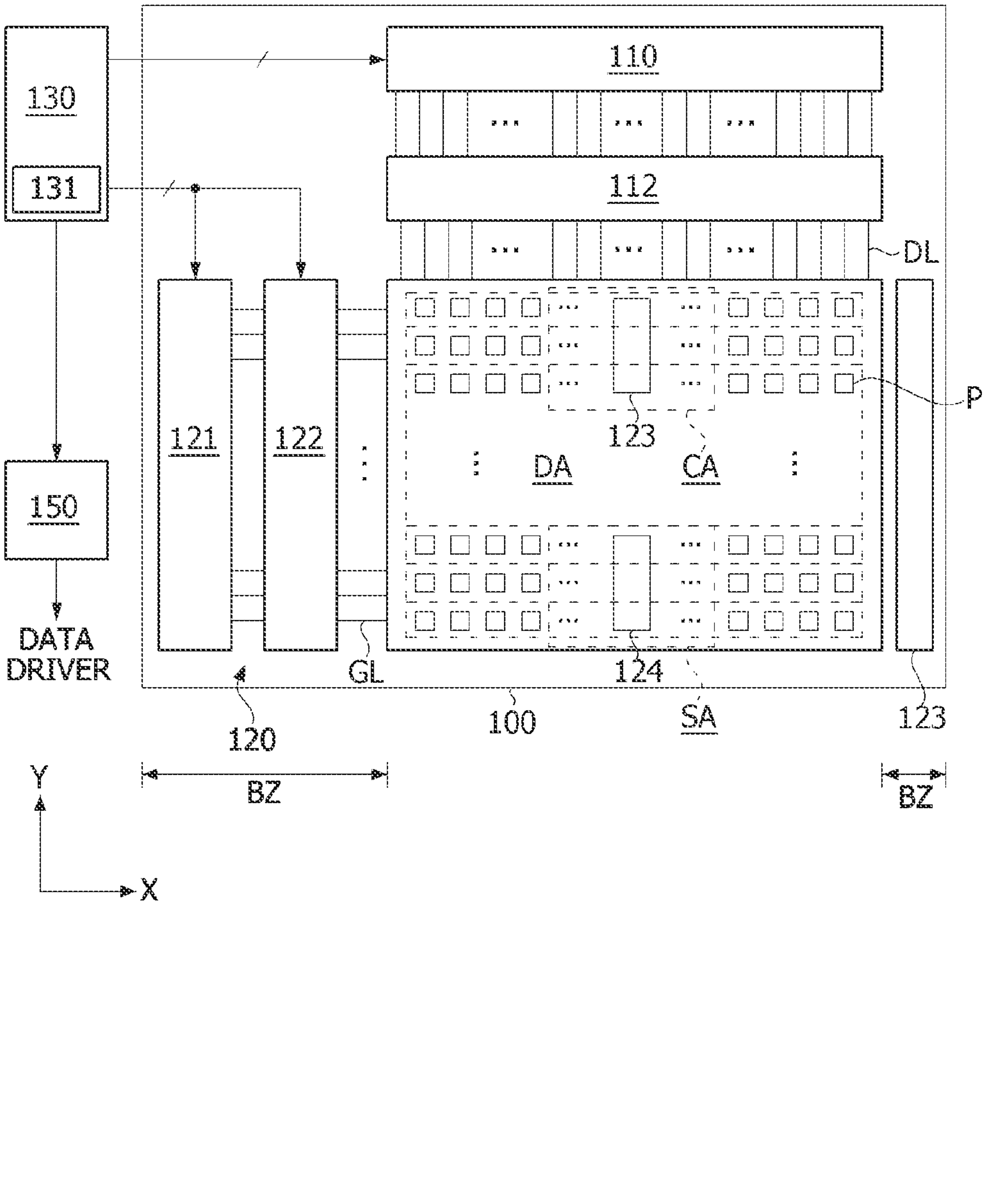
FIG. 5 is a block diagram illustrating a display device according to an embodiment of the present disclosure.

FIG. 5 is a block diagram illustrating a display device according to an embodiment of the present disclosure.

Referring to FIG. 5, the display device according to an embodiment of the present disclosure includes the display panel 100, a display panel driver 110, 112, 120 for writing the pixel data of an input image to pixels P of the display panel 100, a timing controller 130 for controlling the display panel driver, and a power supply unit for generating power required for driving the display panel 100.

The display panel 100 includes a pixel array that displays the input image on a screen. As described above, the pixel array may be divided into the first area DA, and the second area CA having resolution or PPI lower than that of the first area DA. Since the first area DA includes the pixels P of high PPI and thus is larger in size than the second area CA, most of image information is displayed on the first area DA. A sensor module overlapping the second area CA may be disposed in the lower portion of the display panel 100.

The pixel array may further include a third area SA having resolution or PPI lower than that of the first area DA. The third area SA includes pixels arranged with low PPI and a plurality of photo sensors to sense a user's fingerprint.

Touch sensors may be disposed on the screen of the display panel 100. The touch sensors may be disposed on the screen of the display panel in an on-cell type or an add-on type, or may be implemented as in-cell type touch sensors that are incorporated in the pixel array.

The display panel 100 may be implemented as a flexible display panel in which the pixels P are arranged on a flexible substrate such as a plastic substrate or a metal substrate. In a flexible display, the size and shape of the screen may be changed by winding, folding, or bending the flexible display panel. The flexible display may include a slideable display, a rollable display, a bendable display, a foldable display, and the like.

The display panel driver may drive the pixels P by applying the internal compensation technique.

The display panel driver reproduces the input image on the screen of the display panel 100 by writing the pixel data of the input image to the sub-pixels. The display panel driver includes a data driver 110, a first gate driver 120, a second gate driver 123, and a third gate driver 124. The display panel driver may further include a demultiplexer 112 disposed between the data driver 110 and the data lines DL.

The display panel driver may operate in a low speed driving mode under the control of the timing controller 130. In the low speed driving mode, the input image is analyzed and when the input image does not change for a preset period of time, power consumption of the display device may be reduced. In the low speed driving mode, when a still image is inputted for a certain period of time or over, a refresh rate of the pixels P is lowered to control the data writing period of the pixels P to be longer, thereby reducing the power consumption. The low speed driving mode is not limited to when a still image is inputted. For example, when the display device operates in a standby mode or when a user command or an input image is not inputted to a display panel driving circuit for a predetermined period of time or over, the display panel driving circuit may operate in the low speed driving mode.

The data driver 110 samples pixel data to be written to the pixels of the pixel array DA, CA, and SA from the pixel data received from the timing controller 130. The data driver 110 converts the pixel data to be written to the pixels into a gamma compensation voltage using a digital-to-analog converter (hereinafter referred to as "DAC") and outputs a data voltage Vdata.

During a first scanning period in which a gate signal is applied to the first area DA, the data driver 110 outputs a first data voltage synchronized with the gate signal. Due to the difference in the density, i.e., PPI, of turned-on pixels, when the same data voltage as that of the first area DA for each grayscale is applied to the pixels in the second and third areas CA and SA, the luminance of the second and third areas CA and SA may be lower than that of the first area DA. In order to compensate for the luminance difference for each area of the pixel array, the data driver 110 outputs, during the first scanning period in which a gate signal is applied to the first area DA, a first data voltage synchronized with the gate signal, and outputs, during the second and third scanning periods in which a gate signal is applied to the second and third areas CA and SA, second and third data voltages synchronized with the gate signal. The second and third data voltages are set to be in a greater voltage range than that of the first data voltage to increase the luminance of pixels in the second and third areas CA and SA. The voltage level of the data voltage is determined for each grayscale according to the voltage control data of the gamma compensation voltage generator 150.

The gamma compensation voltage generator 150 may be implemented with one programmable gamma IC in which an output voltage is variable depending on the voltage control data inputted from the timing controller 130. The gamma compensation voltage outputted from the gamma compensation voltage generator 150 is inputted to the DAC of the data driver 110. The DAC converts the pixel data into the gamma compensation voltage and outputs the data voltage Vdata. Accordingly, as described above, the data voltage for each area of the pixel array may vary depending on the output voltage of the gamma compensation voltage generator 150 whose output voltage is varied under the control of the timing controller 130.

The demultiplexer 112 time-divisionally distributes the data voltage Vdata outputted through the channels of the data driver 110 to the plurality of data lines DL. Due to the demultiplexer 112, the number of channels of the data driver 110 may be reduced. The demultiplexer 112 may be omitted.

The first gate driver 120 may be implemented in a gate in panel (GIP) circuit formed directly on a bezel area BZ of the display panel 100 together with a TFT array of the pixel array DA, CA, and SA. The bezel area BZ is a non-display area disposed on the edge outside the pixel array DA, CA, and SA on the display panel 100.

The first gate driver 120 applies a gate signal to the gate lines GL connected to the pixels of the first area DA under the control of the timing controller 130. The first gate driver 120 may shift the gate signal using a shift register to sequentially supply the signal to the gate lines GL connected to the pixels of the first area DA. The voltage of the gate signal swings between the gate-off voltage VGH and the gate-on voltage VGL. The gate signal may include a pulse of a scan signal (hereinafter referred to as a "scan pulse") and a pulse of a light emission control signal (hereinafter referred to as an "EM pulse"). The gate lines may include scan lines to which a scan pulse is applied and EM lines to which an EM pulse is applied.

The first gate driver 120 may further include the shift register that supplies a gate signal to some of the gate lines GL connected to the pixels of the second and third areas CA and SA.

The first gate driver 120 may be disposed on each of the left and right bezels BZ of the display panel 100 to supply a gate signal to the gate lines GL in a double feeding method. In the double feeding method, the gate drivers 120 disposed on both bezels of the display panel 100 are synchronized by the timing controller 130, so that the gate signal may be simultaneously applied at both ends of one gate line. In another embodiment, the first gate driver 120 may be disposed on one of the left and right bezels of the display panel 100 to supply a gate signal to the gate lines GL in a single feeding method.

The first gate driver 120 may include a scan driver 121 and an EM driver 122. The scan driver 121 outputs a scan pulse, shifts the scan pulse according to a shift clock, and sequentially supplies the scan pulse to the scan lines. The EM gate driver 122 outputs an EM pulse, shifts the EM pulse according to the shift clock, and sequentially supplies the EM pulse to the EM lines.

The second gate driver 123 applies a gate signal to the gate lines GL connected to the pixels of the second area CA. The gate signal outputted from the second gate driver 123 includes a scan pulse applied to the scan lines of the second area CA and an EM pulse applied to the EM lines of the second area CA. The third gate driver 124 applies a gate signal to the gate lines GL connected to the pixels of the third area SA. The gate signal outputted from the third gate driver 124 includes a scan pulse applied to the scan lines of the third area SA and an EM pulse applied to the EM lines of the third area SA.

Figure 6:
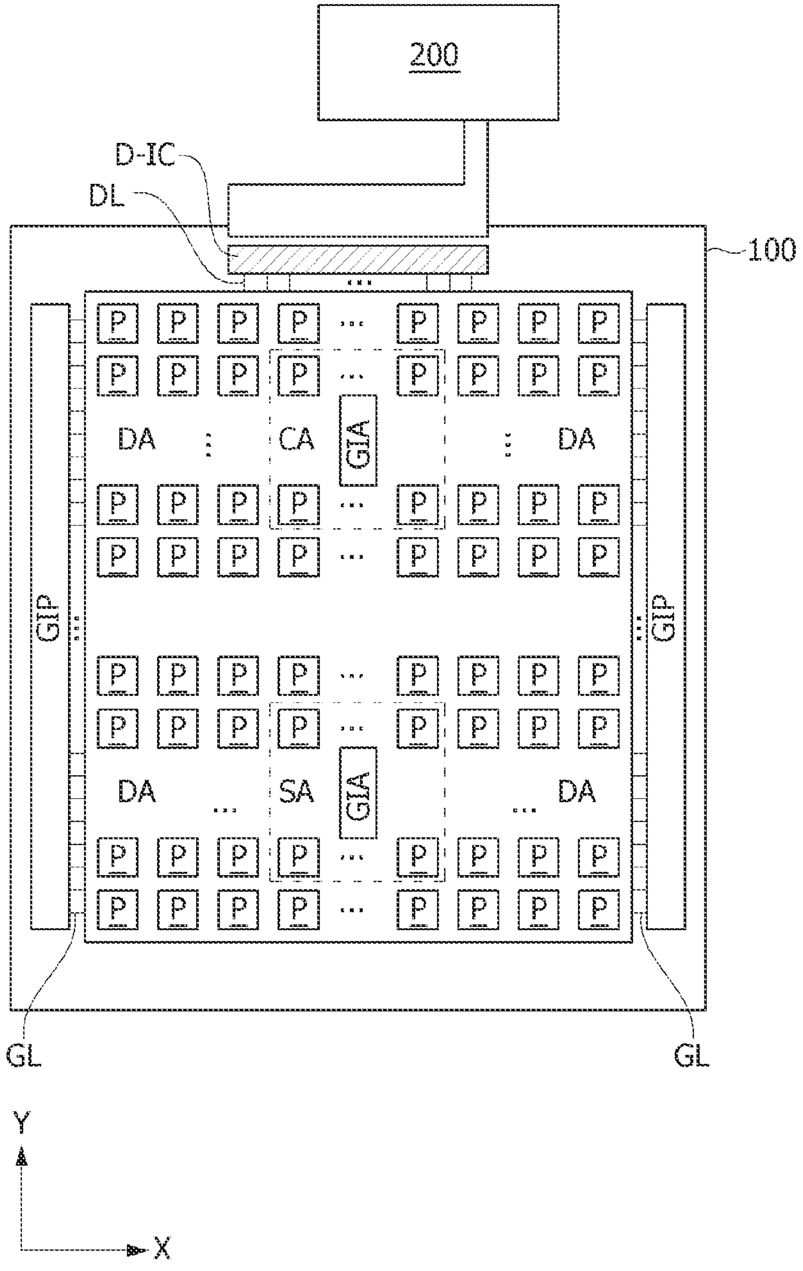
FIG. 6 is a diagram illustrating an example in which a display device according to an embodiment of the present disclosure is applied to a mobile device.

At least some of the transistors and wires of the second and third gate drivers 123 and 124 may, as shown in FIGS. 5 and 6, be implemented in a gate in array (GIA) circuit disposed in the pixel array DA, CA, and SA. Each of the second and third gate drivers 123 and 124 receives a carry signal from the first gate driver 120 to start outputting a gate signal, and includes a shift register that shifts the gate signal.

The timing controller 130 receives pixel data of an input image and a timing signal synchronized with the pixel data from the host system. The timing signal includes a vertical synchronization signal Vsync, a horizontal synchronization signal Hsync, a clock CLK, a data enable signal DE, and the like. One period of the vertical synchronization signal Vsync is one frame period. One period of the horizontal synchronization signal Hsync and the data enable signal DE is one horizontal period 1H. The pulse of the data enable signal DE is synchronized with one line data to be written to the pixels P of one pixel line. Since the frame period and the horizontal period may be known by counting the data enable signal DE, the vertical synchronization signal Vsync and the horizontal synchronization signal Hsync may be omitted.

The timing controller 130 may multiply an input frame frequency by i (i being a natural number) to control the operation timing of the display panel driver 110, 112, and 120 at a frame frequency of the input frame frequency×i Hz. The input frame frequency is 60 Hz in a National Television Standards Committee (NTSC) system and 50 Hz in a Phase-Alternating Line (PAL) system. The timing controller 130 may lower the frame frequency to a frequency between 1 Hz and 30 Hz in order to lower the refresh rate of the pixels P in the low speed driving mode.

The timing controller 130 transmits the pixel data of the input image to the data driver 120, and controls the operation timing of the display panel driver to synchronize the data driver 110, the demultiplexer 112, and the gate drivers 120, 123, and 124. The timing controller 130 generates a data timing control signal for controlling the operation timing of the data driver 110, a switch control signal for controlling the operation timing of the demultiplexer 112, and a gate timing control signal for controlling the operation timing of the gate driver 120, based on the timing signals Vsync. Hsync, and DE received from the host system.

The gate timing control signal may include a start pulse, a shift clock, and the like. The voltage level of the gate timing control signal outputted from the timing controller 130 may be converted into the gate-off voltage VGH/VEH or the gate-on voltage VGL/VEL through a level shifter omitted from the drawing and may be supplied to the gate driver 120. The level shifter may convert a low level voltage of the gate timing control signal into the gate-on voltage VGL, and may convert a high level voltage of the gate timing control signal into the gate-off voltage VGH.

The power supply unit may include a charge pump, a regulator, a buck converter, a boost converter, a gamma compensation voltage generator 150, and the like. The power supply unit receives a DC input voltage from the host system and generates power required for driving the display panel driver and the display panel 100. The power supply unit may output DC voltages such as a gamma reference voltage, the gate-off voltage VGH/VEH, the gate-on voltage VGL/VEL, the pixel driving voltage ELVDD, the low potential power voltage ELVSS, and the initialization voltage Vini. The gamma compensation voltage generator 150 includes a programmable gamma IC that varies the gamma compensation voltage depending on the voltage control data received from the timing controller 130. The gamma compensation voltage is supplied to the data driver 110. The gate-off voltage VGH/VEH and the gate-on voltage VGL/VEL are supplied to the level shifter and the gate driver 120. DC voltages such as the pixel driving voltage ELVDD, the low potential power voltage ELVSS, and the initialization voltage Vini are commonly supplied to the pixel circuits through the power lines. The pixel driving voltage ELVDD is set to a voltage higher than the low potential power voltage ELVSS and the initialization voltage Vini.

The host system may be a main circuit board of a television (TV) system, a set-top box, a navigation system, a personal computer (PC), a vehicle system, a home theater system, a mobile device, or a wearable device.

In the mobile device or the wearable device, the timing controller 130, the data driver 110, and the power supply unit may be integrated into one drive integrated circuit (D-IC) as shown in FIG. 6. In FIG. 6, reference numeral "200" denotes the host system.

Figure 7:
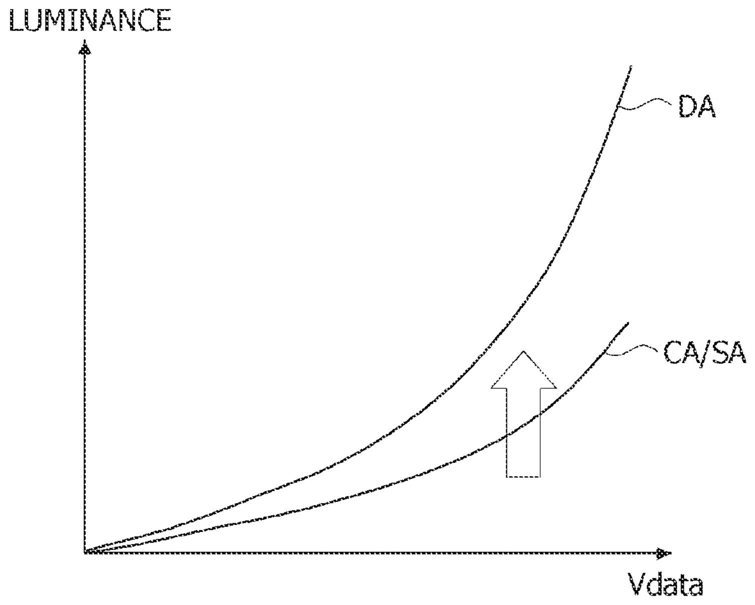
FIG. 7 is a diagram showing a luminance difference between areas due to a PPI difference.

The PPI of the second and third areas CA and SA is lower than that of the first area DA. For this reason, if the data voltage Vdata applied to the pixels P of the second and third areas CA and SA is equal to the data voltage Vdata applied to the pixels P of the first area DA at the same grayscale, as shown in FIG. 7, the luminance of the second and third regions CA and SA may be lower than the luminance of the first area DA.

In order to compensate for the luminance difference between the areas DA, CA, and SA of the pixel array, the gamma compensation voltage generator 150 outputs the gamma compensation voltage as a voltage for each area defined by the voltage control data under the control of the timing controller 130.

The timing controller 130 includes a data voltage control unit that controls a dynamic range of a data voltage for each area so that the luminance difference between the areas of the pixel array DA, CA, and SA is not visually recognized. The data voltage control unit outputs first voltage control data for controlling the dynamic range of the data voltage applied to the pixels in the area DA of high PPI during the scanning period of the high PPI area DA, and outputs second voltage control data for controlling the dynamic range of the data voltage applied to the pixels in the area CA and SA of low PPI during the scanning period of the low PPI area CA and SA.

The gamma compensation voltage generator 150 outputs a first gamma compensation voltage in response to the first voltage control data during the scanning period of the high PPI area DA by using one programmable gamma IC, and outputs a second gamma compensation voltage in response to the second voltage control data during the scanning period of the low PPI area CA and DA. The data driver 110 converts the pixel data into the first gamma compensation voltage during the scanning period of the high PPI area DA, and outputs a data voltage charged to the pixels of the high PPI area. In addition, the data driver 110 converts the pixel data into the second gamma compensation voltage during the scanning period of the low PPI area CA and SA, and outputs a data voltage charged to the pixels of the low PPI area CA and SA.

The first gate driver 120 supplies a gate signal to the gate lines GL of the high PPI area DA. The second and third gate drivers 123 and 124 may receive a carry signal from the first gate driver 120 and supply a gate signal to the gate lines GL of the low PPI area CA and SA.

Figure 8:
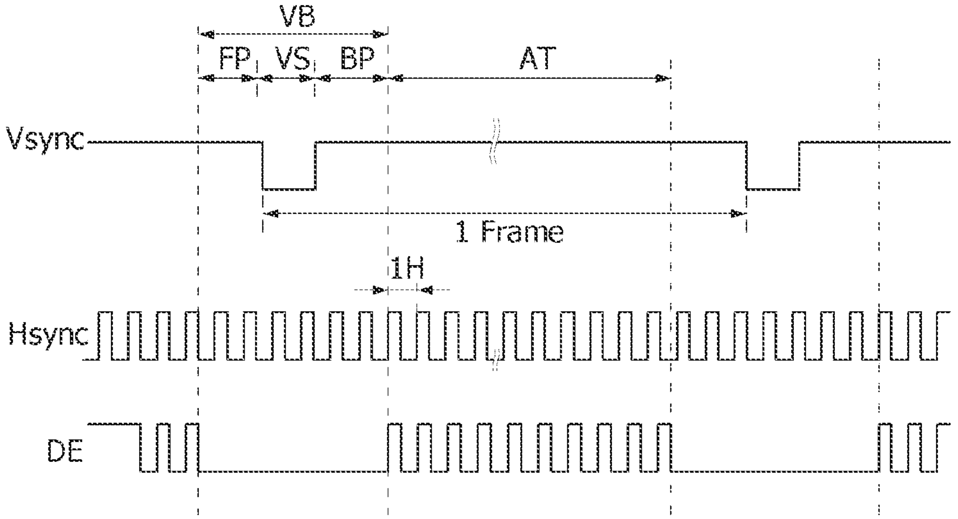
FIG. 8 is a diagram illustrating one frame period of a display device.

FIG. 8 is a diagram illustrating one frame period of a display device. In FIG. 8, the vertical synchronization signal Vsync, the horizontal synchronization signal Hsync, and the data enable signal DE are timing signals synchronized with pixel data of an input image.

Referring to FIG. 8, one frame period is divided into an active interval AT in which the pixel data of the input image is written to the pixels, and a vertical blank period VB having no pixel data.

The vertical blank period VB is a blank period in which pixel data is not received by the timing controller 130 between the active interval AT of an $(N-1)^{th}$ (N being a natural number) frame period and the active interval AT of an $N^{th}$ fame period. The vertical blank period VB includes a vertical sync time VS, a vertical front porch FP, and a vertical back porch BP.

The vertical synchronization signal Vsync defines one frame period. The horizontal synchronization signal Hsync defines one horizontal period 1H. The data enable signal DE defines an effective data section including pixel data to be written to the pixels. The pulse of the data enable signal DE is synchronized with the pixel data to be written to the pixels of the display panel 100. One pulse period of the data enable signal DE is one horizontal period 1H.

Figure 9:
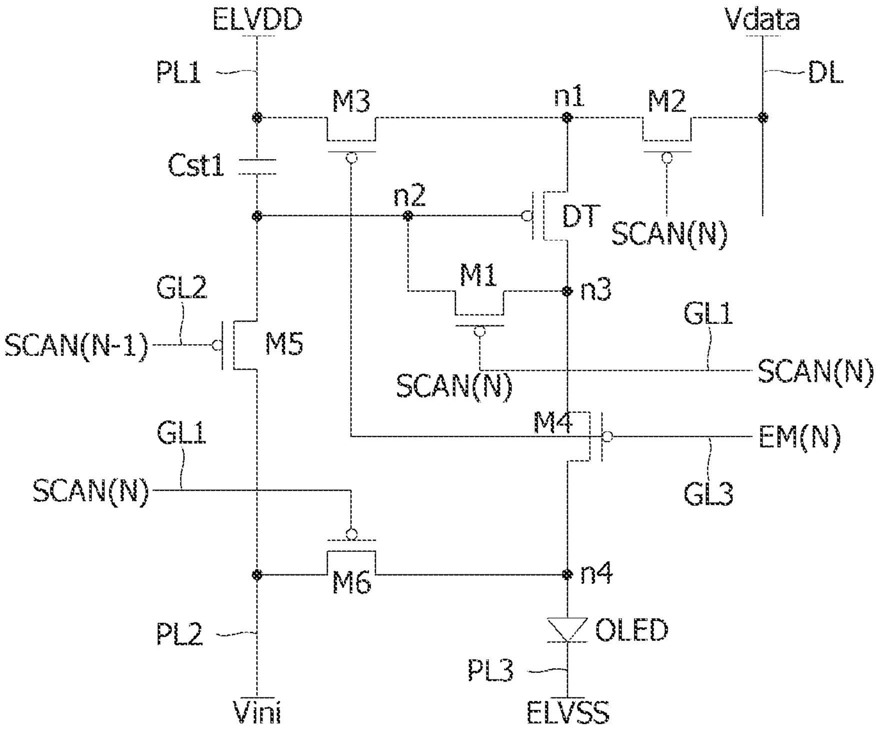
FIG. 9 is a circuit diagram illustrating an example of a pixel circuit.
Figure 10:
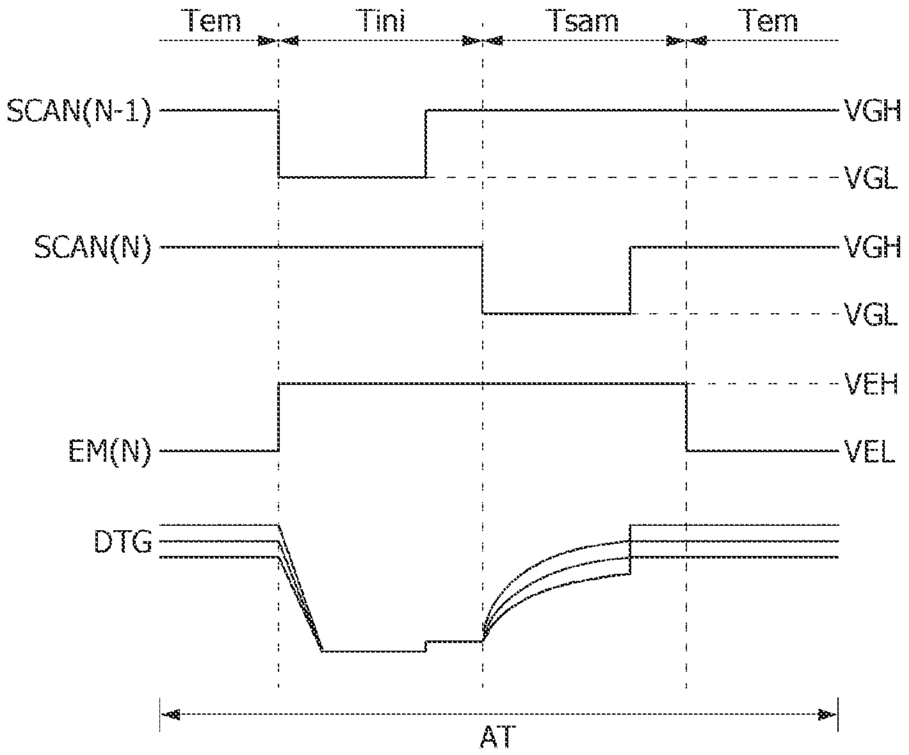
FIG. 10 is a waveform diagram illustrating a method of driving the pixel circuit shown in FIG. 9.

FIG. 9 is a circuit diagram illustrating an example of a pixel circuit. FIG. 10 is a waveform diagram illustrating a method of driving the pixel circuit shown in FIG. 9.

Referring to FIGS. 9 and 10, the pixel circuit includes a light emitting element OLED, a driving element DT for supplying a current to the light emitting element OLED, and a switch circuit for switching voltages applied to the light emitting element OLED and the driving element DT.

The switch circuit is connected to power lines PL1, PL2, and PL3 to which the pixel driving voltage ELVDD, the low potential power voltage ELVSS, and the initialization voltage Vini are applied, the data line DL, and gate lines GL1, GL2, and GL3, and switches the voltages applied to the light emitting element OLED and the driving element DT in response to scan pulses SCAN(N−1) and SCAN(N) and an EM pulse EM(N). The switch circuit includes an internal compensation circuit that samples, using first to sixth switch elements M1 to M6, a threshold voltage Vth of the driving element DT and applies the data voltage Vdata of pixel data to the driving element DT. Each of the driving element DT and the switch elements M1 to M6 may be implemented with a p-channel TFT.

The driving period of the pixel circuit may be divided, as shown in FIG. 10, into an initialization period Tini, a sampling period Tsam, and a light emission period Tem. The initialization period Tini and the sampling period Tsam are defined by a scan pulse synchronized with the data voltage Vdata.

An $N^{th}$ scan pulse SCAN(N) is generated as the gate-on voltage VGL during the sampling period Tsam, and is applied to an $N^{th}$ scan line GL1. The $N^{th}$ scan pulse SCAN (N) is synchronized with the data voltage Vdata applied to the pixels of an $N^{th}$ pixel line. An $(N-1)^{th}$ scan pulse SCAN(N−1) is generated as the gate-on voltage VGL during the initialization period Tini prior to the sampling period, and is applied to an $(N-1)^{th}$ scan line GL2. The $(N-1)^{th}$ scan pulse SCAN(N−1) is generated prior to the $N^{th}$ scan pulse SCAN(N) and is synchronized with the data voltage Vdata applied to the pixels of an $(N-1)^{th}$ pixel line. The EM pulse EM(N) is generated as the gate-off voltage VGH during the initialization period Tini and the sampling period Tsam, and is applied to an EM line GL3. The EM pulse EM(N) may be simultaneously applied to the pixels of the $(N-1)^{th}$ and $N^{th}$ pixel lines.

During the initialization period Tini, the $(N-1)^{th}$ scan pulse SCAN(N−1) of the gate-on voltage VGL is applied to the $(N-1)^{th}$ scan line GL2, and the EM pulse of the gate-off voltage VGH is applied to the EM line GL3. In this case, the voltage of the $N^{th}$ scan line GL1 is the gate-off voltage VGH. During the initialization period Tin, the fifth switch element M5 is turned on according to the gate-on voltage VGL of the $(N-1)^{th}$ scan pulse SCAN(N−1) to initialize the pixel circuit of the first area DA.

During the sampling period Tsam, the $N^{th}$ scan pulse SCAN(N) of the gate-on voltage VGL is applied to the $N^{th}$ scan line GL1. In this case, the voltages of the $(N-1)^{th}$ scan line GL2 and the EM line GL3 are the gate-off voltage. During the sampling period Tsam, the first and second switch elements M1 and M2 are turned on according to the gate-on voltage VGL of the $N^{th}$ scan pulse SCAN(N), so that the driving element DT is turned on, thereby sampling the threshold voltage Vth of the driving element DT, and storing the data voltage Vdata compensated by the threshold voltage Vth in a capacitor Cst1. At the same time, the sixth switch element M6 is turned on during the sampling period Tsam to lower the voltage of a fourth node n4 to the reference voltage Vref, thereby suppressing the light emission of the light emitting element OLED.

When the light emission period Tem starts, the EM line GL3 is inverted to the gate-on voltage VGL. During the light emission period Tem, the scan lines GL1 and GL2 maintain the gate-off voltage VGH. During the light emission period Tem, the third and fourth switch elements M3 and M4 are turned on, so that the light emitting element OLED may emit light. During the light emission period Tem, in order to accurately express the luminance of the low grayscale, the voltage level of the EM pulse EM(N) may be inverted at a predetermined duty ratio between the gate-on voltage VGL and the gate-off voltage VGH. In this case, the third and fourth switch elements M3 and M4 may be repeatedly turned on/off according to the duty ratio of the EM pulse EM(N) during the light emission period Tem.

The anode electrode of the light emitting element OLED is connected to the fourth node n4 between the fourth and sixth switch elements M4 and M6. The fourth node n4 is connected to the anode electrode of the light emitting element OLED, the second electrode of the fourth switch element M4, and the second electrode of the sixth switch element M6. The cathode electrode of the light emitting element OLED is connected to a VSS line PL3 to which the low potential power voltage ELVSS is applied. The light emitting element OLED emits light by a current Ids flowing according to the gate-source voltage Vgs of the driving element DT. The current path of the light emitting element OLED is switched by the third and fourth switch elements M3 and M4.

The capacitor Cst1 is connected between a VDD line PL1 and a second node n2.

After the sampling period Tsam is over, the data voltage Vdata compensated by the sampled threshold voltage Vth of the driving element DT is charged in the capacitor Cst1. Since the data voltage Vdata is compensated by the threshold voltage Vth of the driving element DT in each of the sub-pixels, the deviation in the electrical properties of the driving element DT is compensated in the sub-pixels.

The first switch element M1 is turned on in response to the gate-on voltage VGL of the $N^{th}$ scan pulse SCAN(N) to connect the second node n2 to a third node n3. The second node n2 is connected to the gate electrode of the driving element DT, the first electrode of the capacitor Cst1, and the first electrode of the first switch element M1. The third node n3 is connected to the second electrode of the driving element DT, the second electrode of the first switch element M1, and the first electrode of the fourth switch element M4. The gate electrode of the first switch element M1 is connected to the $N^{th}$ scan line GL1 to receive the $N^{th}$ scan pulse SCAN(N). The first electrode of the first switch element M1 is connected to the second node n2, and the second electrode of the first switch element M1 is connected to the third node n3.

Since the first switch element M1 is turned on only for one horizontal period 1H, which is very short, in which the $N^{th}$ scan pulse SCAN(N) is generated as the gate-on voltage VGL in one frame period, a leakage current may occur in the off state. In order to suppress the leakage current in the first switch element M1, the first switch element M1 may be implemented with a transistor having a dual gate structure in which two transistors are connected in series.

The second switch element M2 is turned on in response to the gate-on voltage VGL of the $N^{th}$ scan pulse SCAN(N) to supply the data voltage Vdata to a first node n1. The gate electrode of the second switch element M2 is connected to the $N^{th}$ scan line GL1 to receive the $N^{th}$ scan pulse SCAN (N). The first electrode of the second switch element M2 is connected to the first node n1. The second electrode of the second switch element M2 is connected to the data line DL of the first area DA to which the data voltage Vdata is applied. The first node n1 is connected to the first electrode of the second switch element M2, the second electrode of the third switch element M3, and the first electrode of the driving element DT.

The third switch element M3 is turned on in response to the gate-on voltage VEL of the EM pulse EM(N) to connect the VDD line PL1 to the first node n1. The gate electrode of the third switch element M3 is connected to the EM line GL3 to receive the EM pulse EM(N). The first electrode of the third switch element M3 is connected to the VDD line PL1. The second electrode of the third switch element M3 is connected to the first node n1.

The fourth switch element M4 is turned on in response to the gate-on voltage VEL of the EM pulse EM(N) to connect the third node n3 to the anode electrode of the light emitting element OLED. The gate electrode of the fourth switch element M4 is connected to the EM line GL3 to receive the EM pulse EM(N). The first electrode of the fourth switch element M4 is connected to the third node n3, and the second electrode thereof is connected to the fourth node n4.

The fifth switch element M5 is turned on in response to the gate-on voltage VGL of the $(N-1)^{th}$ scan pulse SCAN (N-1) to connect the second node n2 to a Vini line PL2. The gate electrode of the fifth switch element M5 is connected to the $(N-1)^{th}$ scan line GL2 to receive the $(N-1)^{th}$ scan pulse SCAN(N-1). The first electrode of the fifth switch element M5 is connected to the second node n2, and the second electrode thereof is connected to the Vini line PL2. In order to suppress a leakage current in the fifth switch element M5, the fifth switch element M5 is implemented with a transistor having a dual gate structure in which two transistors are connected in series.

The sixth switch element M6 is turned on in response to the gate-on voltage VGL of the $N^{th}$ scan pulse SCAN(N) to connect the Vini line PL2 to the fourth node n4. The gate electrode of the sixth switch element M6 is connected to the $N^{th}$ scan line GL1 to receive the $N^{th}$ scan pulse SCAN(N). The first electrode of the sixth switch element M6 is connected to the Vini line PL2, and the second electrode thereof is connected to the fourth node n4.

In another embodiment, the gate electrodes of the fifth and sixth switch elements M5 and M6 may be commonly connected to the $(N-1)^{th}$ scan line GL2 to which the $(N-1)^{th}$ scan pulse SCAN(N-1) is applied. In this case, the fifth and sixth switch elements M5 and M6 may be simultaneously turned on in response to the $(N-1)^{th}$ scan pulse SCAN(N-1).

The driving element DT drives the light emitting element OLED by controlling a current flowing through the light emitting element OLED according to the gate-source voltage Vgs. The driving element DT includes a gate connected to the second node n2, a first electrode connected to the first node n1, and a second electrode connected to the third node n3.

During the initialization period Tini, the $(N-1)^{th}$ scan pulse SCAN(N-1) is generated as the gate-on voltage VGL. The $N^{th}$ scan pulse SCAN(N) and the EM pulse EM(N) maintain the gate-off voltage VGH during the initialization period Tini. Accordingly, during the initialization period Tini, the fifth switch element M5 is turned on, so that the second and fourth nodes n2 and n4 are initialized to Vini. A hold period may be set between the initialization period Tini and the sampling period Tsam. During the hold period, the voltages of the scan lines GL1 and GL2 and the EM line GL3 are the gate-off voltage.

During the sampling period Tsam, the $N^{th}$ scan pulse SCAN(N) is generated as the gate-on voltage VGL. The $N^{th}$ scan pulse SCAN(N) is synchronized with the data voltage Vdata of the $N^{th}$ pixel line. The $(N-1)^{th}$ scan pulse SCAN (N-1) and the EM pulse EM(N) maintain the gate-off voltage VGH during the sampling period Tsam. Accordingly, the first and second switch elements M1 and M2 are turned on during the sampling period Tsam.

During the sampling period Tsam, a gate voltage DTG of the driving element DT rises by a current flowing through the first and second switch elements M1 and M2. When the driving element DT is turned off, the gate voltage DTG of the driving element DT is Vdata−|Vth|, and the source voltage of the driving element DT is ELVDD−|Vth|. Accordingly, when the sampled threshold voltage Vth of the driving element DT is stored in the capacitor Cst1, the gate-source voltage Vgs of the driving element DT is ELVDD-Vdata. As a result, a current Ioled flowing through the light emitting element OLED during the light emission period Tem is not affected by the threshold voltage Vth of the driving element DT.

During the light emission period Tem, when the EM pulse EM(N) is the gate-on voltage VEL, a current flows between the pixel driving voltage ELVDD and the light emitting element OLED, so that the light emitting element OLED may emit light. During the light emission period Tem, the $(N-1)^{th}$ and $N^{th}$ scan pulses SCAN(N−1) and SCAN(N) maintain the gate-off voltage VGH. During the light emission period Tem, the third and fourth switch elements M3 and M4 are turned on according to the gate-on voltage of the EM pulse EM(N). When the EM pulse EM(N) is the gate-on voltage VGL, the third and fourth switch elements M3 and M4 are turned on, so that a current flows through the light emitting element OLED. At this time, the current Ioled flowing through the driving element DT to the light emitting element OLED is $K(ELVDD-Vdata)^2$. K is a constant value determined by charge mobility, parasitic capacitance, channel ratio W/L, and the like of the driving element DT.

Figure 11:
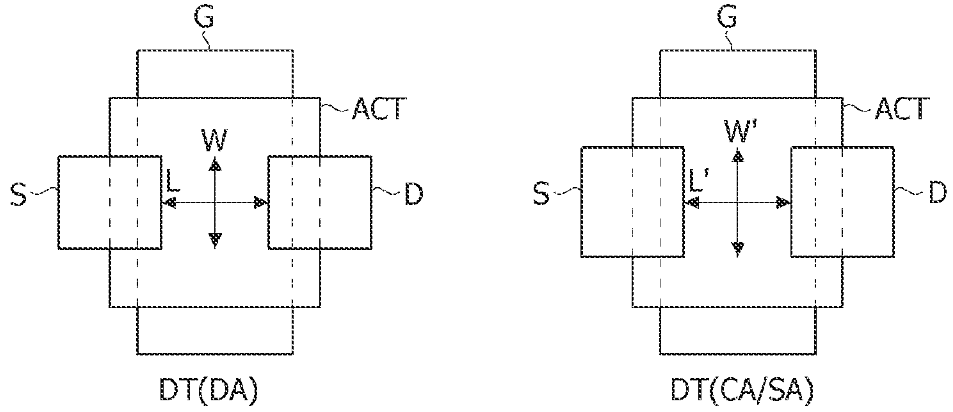
FIG. 11 is a plan view schematically showing a channel of a driving element.

In order to reduce the luminance difference between the areas of the pixel array DA, CA, and SA, the channel ratio W/L of the driving element DT arranged in the second and third areas CA and SA is further increased than that of the driving element DT arranged in the first area DA, thereby increasing a current that drives the light emitting element OLED. In the example of FIG. 11, “DT(DA)” is the driving element DT disposed in the first area DA. “DT(CA/SA)” is the driving element DT disposed in the second and third areas CA and SA. In order to increase the luminance of the second and third areas CA and SA, a channel width W' of the driving element DT disposed in the second and third areas CA and DA may be made greater than that of the first area DA, or alternatively, a channel ratio W'/L' thereof may be set greater than that by reducing a channel length L. In FIG. 11, ‘ACT’ indicates an active region of the driving element DT, ‘G’ indicates a gate of the driving element DT, ‘D’ indicates a drain of the driving element DT, and ‘S’ indicates a source of the driving element DT.

Figure 12:
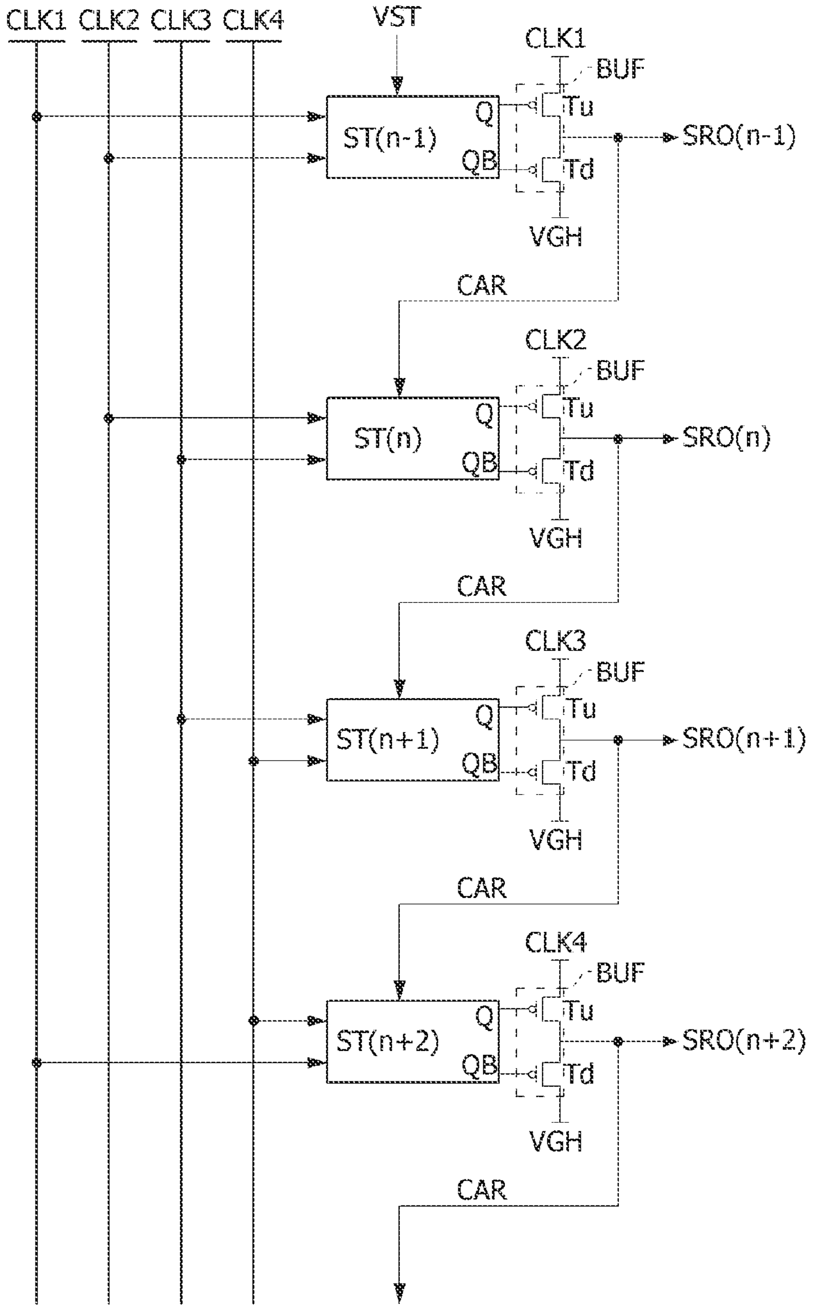
FIG. 12 is a block diagram schematically showing a shift register of a gate driver.
Figure 13:
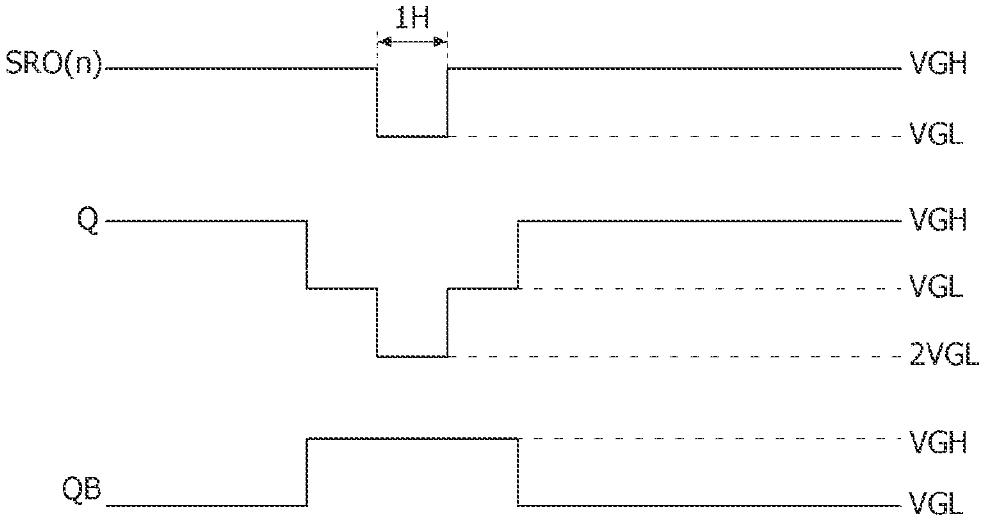
FIG. 13 is a waveform diagram showing control node voltages and an output signal of an $n^{th}$ signal transmission unit shown in FIG. 12.

FIG. 12 is a block diagram schematically showing a shift register that outputs a scan pulse. FIG. 13 is a waveform diagram showing control node voltages and an output signal of an $n^{th}$ signal transmission unit shown in FIG. 12.

Referring to FIGS. 12 and 13, the shift register includes signal transmission units ST(n−1) to ST(n+2) that are dependently connected. Each of the signal transmission units ST(n−1) to ST(n+2) includes a VST node through which a start pulse VST is inputted, a CLK node through which a shift clock CLK1 to CLK4 is inputted, and an output node through which a scan pulse SRO(n−1) to SRO(n+2) is outputted. The start pulse VST is substantially inputted to a first signal transmission unit. The shift clock CLK1 to CLK4 may be a 4-phase clock, but is not limited thereto.

In the example of FIG. 12, an $(n-1)^{th}$ signal transmission unit ST(n−1) may be the first signal transmission unit. The signal transmission units ST(n) to ST(n+2) dependently connected to the $(n-1)^{th}$ signal transmission unit ST(n−1) receive a carry signal CAR from the previous signal transmission unit and starts to be driven. The carry signal CAR may be the scan pulse SRO(n−1) to SRO(n+2) outputted from the previous signal transmission unit. Each of the signal transmission units ST(n−1) to ST(n+2) may output the carry signal CAR through a separate carry signal output node. The carry signal CAR is outputted simultaneously with the scan pulse SRO(n−1) to SRO(n+2) outputted from the previous signal transmission unit.

Each of the signal transmission units ST(n−1) to ST(n+2) includes a first control node Q, a second control node QB, and a buffer BUF. The buffer BUF outputs a gate signal to the gate line through the output node using a pull-up transistor Tu and a pull-down transistor Td.

When the voltage of the first control node Q is charged and the shift clock CLK1 to CLK4 is inputted, the pull-up transistor Tu is turned on to charge the voltage of the output node up to the gate-on voltage VGL. At this time, the scan pulse SRO(n−1) to SRO(n+2) and the carry signal CAR rise up to the gate-on voltage VGL. When the voltage of the shift clock CLK1 to CLK4 changes to the gate-on voltage VGL, the voltage of the first control node Q is bootstrapped to be increased up to the gate-on voltage of approximately 2VGL. When the voltage of the first control node Q becomes substantially higher than the threshold voltage of the pull-up transistor, the pull-up transistor Tu is turned on.

The voltage of the second control node QB is set to the gate-off voltage VGH when the first control node Q is charged to a voltage equal to or higher than the gate-on voltage VGL. When the voltage of the second control node QB is charged to the gate-on voltage VGL, the pull-down transistor Td is turned on to supply the gate-off voltage VGH to the output node. At this time, the scan pulse SRO(n−1) to SRO(n+2) and the carry signal CAR fall to the gate-off voltage VGH.

Figure 19:
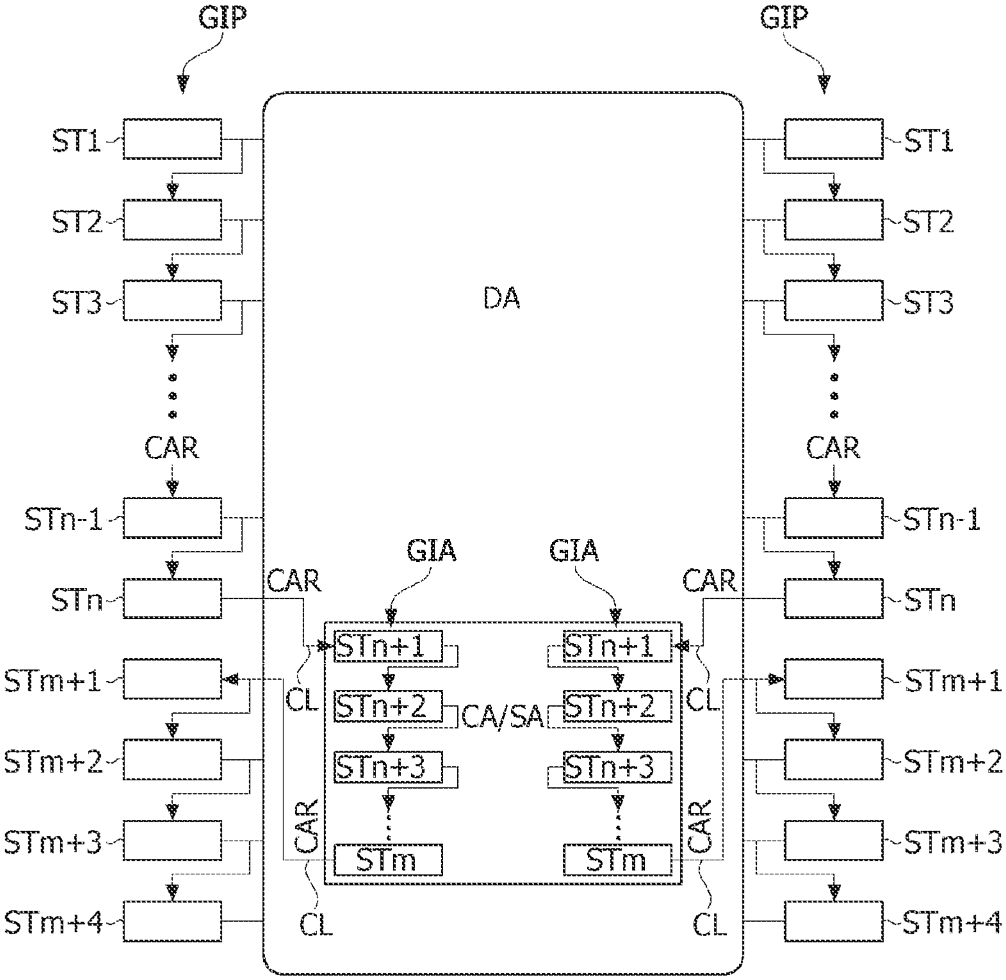

The shift register that outputs the EM pulse has a structure similar to that of a shift register shown in FIG. 19. The signal transmission units of the shift register start to be driven when a start pulse or carry signal is inputted, and sequentially output the EM pulse.

The timing controller 130 includes a data voltage control unit 131 for controlling a data voltage for each area of the pixel array DA, CA, and SA. The data voltage control unit 131 determines an area of the pixel array DA, CA, and SA to which the pixel data is written, and selects voltage control data for controlling the output voltage of the gamma compensation voltage generator 150 for each area.

When the signal transmission units shown in FIG. 12 are implemented in a GIA circuit, transistors of the signal transmission units may be dispersedly disposed in the pixel array DA, CA, and SA.

Figure 14:
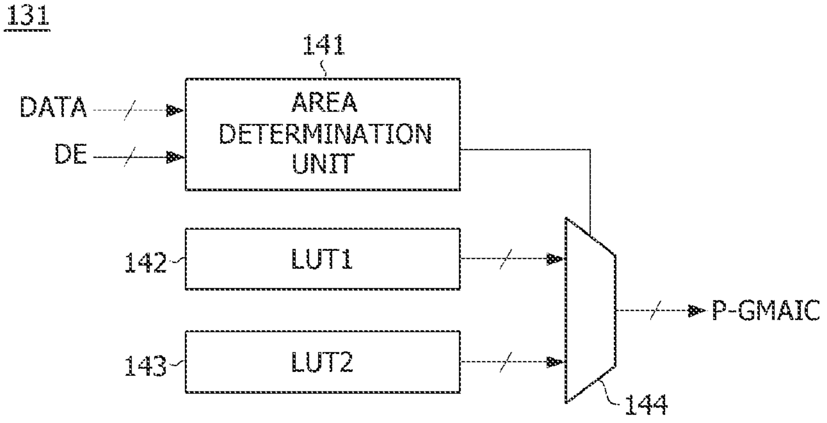
FIG. 14 is a block diagram showing a data voltage control unit.

FIG. 14 is a block diagram illustrating the data voltage control unit 131.

Referring to FIG. 14, the data voltage control unit 131 includes an area determination unit 141, a first look-up table 142, a second look-up table 143, and a data selection unit 144. In FIG. 14, “LUT1” is the first look-up table 142, and “LUT2” is the second look-up table 143.

The area determination unit 141 receives pixel data DATA and the data enable signal DE synchronized with the pixel data DATA. The area determination unit 141 counts the data enable signal DE as a clock for sampling data bits and determines an area of the pixel array DA, CA, and SA to which the pixel data is to be written.

The first and second look-up tables 142 and 143 are stored in a memory. The first look-up table 142 includes first voltage control data in which the data voltage of the first area DA is set for each grayscale. The second look-up table 143 includes second voltage control data in which data voltages of the second and third areas CA and SA are set for each grayscale. The second voltage control data may be experimentally determined so that the luminance of the second and third areas CA and SA is equal to the luminance of the first area DA for each grayscale. In particular, the second voltage control data may be set as data for selecting a higher voltage than the first voltage control data in high grayscale.

The efficiency of the light emitting element OLED may vary depending on the color of the sub-pixel. The voltage control data may be set independently in each of the first and second look-up tables 142 and 143 for each color of the sub-pixels so that a gamma compensation voltage optimized for each color of the light emitting element OLED can be output in response to an efficiency difference of each color. For example, the first look-up table 142 may include a first-first look-up table in which first-first voltage control data for determining a data voltage applied to the R sub-pixel has been set, a first-second look-up table in which first-second voltage control data for determining a data voltage applied to the G sub-pixel has been set, and a first-third look-up table in which first-third voltage control data for determining a data voltage applied to the B sub-pixel has been set. The second look-up table 143 may include a second-first look-up table in which second-first voltage control data for determining a data voltage applied to the R sub-pixel has been set, a second-second look-up table in which second-second voltage control data for determining a data voltage applied to the G sub-pixel has been set, and a second-third look-up table in which second-third voltage control data for determining a data voltage applied to the B sub-pixel has been set.

The data selection unit 144 selects voltage control data outputted from the first and second look-up tables 142 and 143 in response to a selection signal inputted from the area determination unit 141. During the scanning period in which the gate signal is applied to the pixels of the first area DA, the data selection unit 144 selects the first voltage control data from the first look-up table 142 and supplies it to the gamma compensation voltage generator 150. During the scanning period in which the gate signal is applied to the pixels of the second and third areas CA and SA, the data selection unit 144 selects the second voltage control data from the second look-up table 142 and supplies it to the gamma compensation voltage generator 150. The data selection unit 144 may be implemented with multiplexers.

The gamma compensation voltage generator 150 outputs a gamma compensation voltage of each grayscale at a voltage level indicated by the voltage control data from the data voltage control unit 131. Accordingly, the display device of the present disclosure may vary the data voltage applied to the areas having different resolutions or PPIs using one gamma compensation voltage generator 150, thereby uniformly controlling the luminance over the entire screen of the full-screen display.

Figure 15:
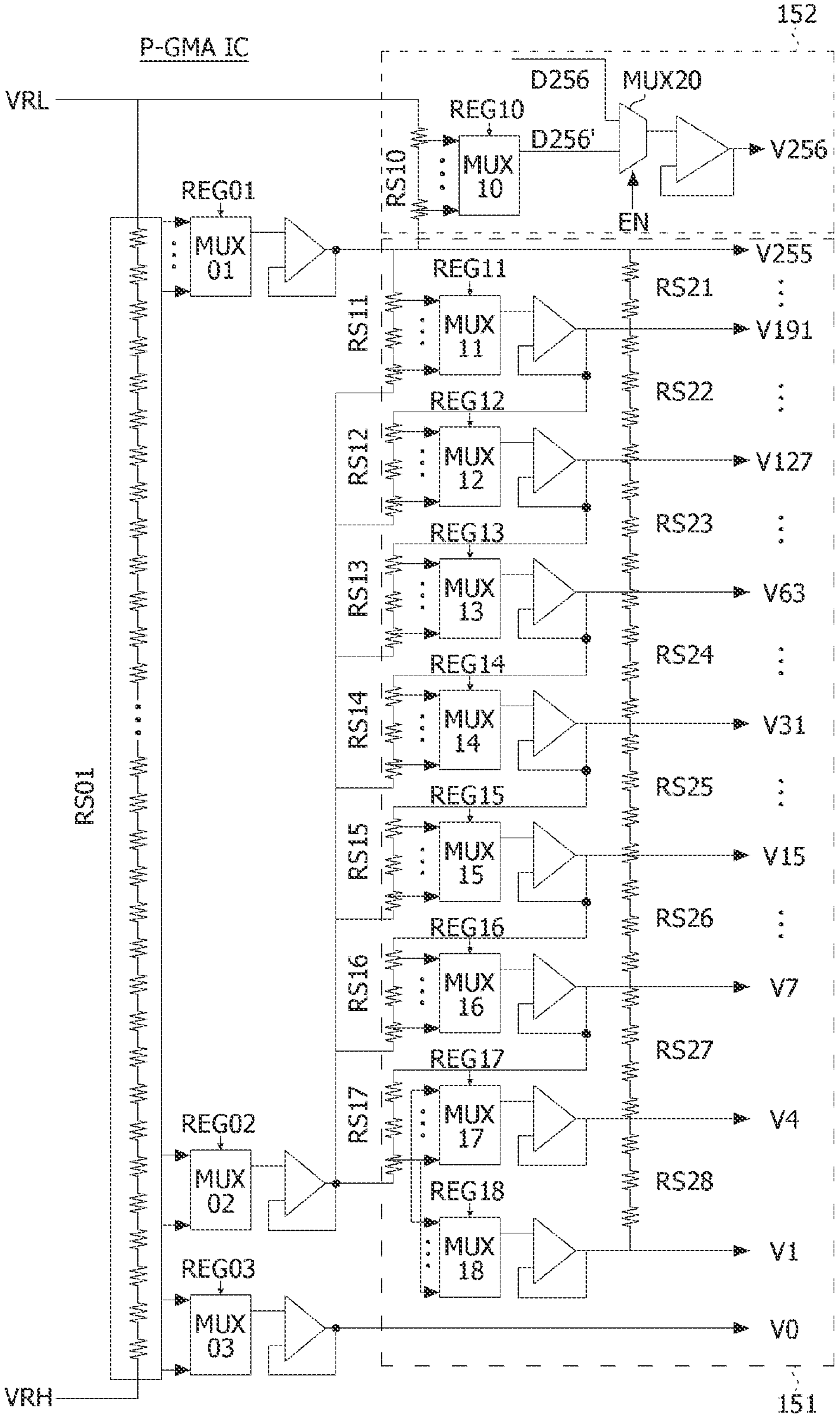
FIG. 15 is a circuit diagram showing a gamma compensation voltage generator according to an embodiment of the present disclosure.

FIG. 15 is a circuit diagram illustrating a gamma compensation voltage generator according to an embodiment of the present disclosure.

Referring to FIG. 15, the gamma compensation voltage generator 150 receives a high potential reference voltage VRH and a low potential reference voltage VRL.

When the driving element DT of the pixel circuit shown in FIG. 9 is implemented with a p-channel transistor, the amount of current flowing through the driving element DT to the light emitting element OLED increases as the data voltage decreases. Accordingly, in the pixel circuit shown in FIG. 9, the data voltage is set as an inverse gamma compensation voltage. The gamma compensation voltage generator 150 shown in FIG. 15 is one example of generating the inverse gamma compensation voltage. The data voltage may be set as a positive gamma compensation voltage, depending on the pixel circuit. In this case, in FIG. 15, the application nodes of the high potential reference voltage VRH and the low potential reference voltage VRL may be switched.

The gamma compensation voltage generator 150 includes a plurality of voltage divider circuits and a plurality of multiplexers MUX01 to MUX03 and MUX10 to MUX18. The voltage divider circuit divides a voltage between a high potential voltage and a low potential voltage using resistors connected in series to output voltages having different voltage levels. Each of the multiplexers MUX01 to MUX18 selects a voltage indicated by voltage control data REG01 to REG03 and REG10 to REG18 among the voltages divided by the voltage divider circuit.

The data voltage control unit 131 determines an area of the pixel array DA, CA, and SA to which the pixel data is written. The data voltage control unit 131 controls the multiplexers MUX01 to MUX03 and MUX11 to MUX18 to select the output voltages of the multiplexers MUX01 to MUX03 and MUX11 to MUX18 for each area of the pixel array. The first voltage control data is inputted to the control nodes of the multiplexers MUX01 to MUX03 and MUX11 to MUX18 during the scanning period of the first area DA. The second voltage control data is inputted to the control nodes of the multiplexers MUX0 to MUX03 and MUX11 to MUX18 during the scanning period of the second and third areas CA and SA.

Each of the multiplexers MUX01 to MUX18 selects any one of the divided voltages in response to the first voltage control data during the scanning period of the high PPI area DA, and selects any one of the divided voltages in response to the second voltage control data during the scanning period of the low PPI area CA and SA.

The gamma compensation voltage generator 150 includes an input voltage selection unit, a grayscale voltage generation unit 151 that generates a gamma compensation voltage, and a light source driving voltage generation unit 152.

The input voltage selection unit includes a voltage divider circuit RS01, a multiplexer MUX01 that selects the highest grayscale voltage V255 according to the voltage control data REG01, a multiplexer MUX02 that selects a lower gamma compensation voltage according to the voltage control data REG02, and a multiplexer MUX03 that outputs the lowest gamma compensation voltage V0 according to the voltage control data REG03. The voltage outputted from the multiplexer MUX01 is supplied to the voltage divider circuit of the grayscale voltage generation unit 151 and the light source driving voltage generation unit 152. The first voltage control data is inputted to the control nodes of the multiplexers MUX01, MUX02, and MUX03 of the input voltage selection unit during the scanning period of the first area DA of the pixel array. The second voltage control data is inputted to the control nodes of the multiplexers MUX01, MUX02, and MUX03 of the input voltage selection unit during the scanning period of the second and third areas CA and SA of the pixel array.

At least some of the pixels of the third area SA are driven as a light source in the fingerprint recognition mode. The light source of the third area SA may emit light with a luminance higher than the maximum luminance of pixels disposed in the first and second areas DA and CA. The light source driving voltage generation unit 152 generates a driving voltage of the light source in the fingerprint recognition mode.

The light source driving voltage generation unit 152 includes a tenth voltage divider circuit RS10 connected between a VRL node and a V255 node, and multiplexers MUX10 and MUX20. The voltage divider circuit RS10 divides a voltage between the low potential reference voltage VRL and the highest grayscale voltage V255. The output voltages of the voltage divider circuit RS10 have a voltage level of higher grayscale than the highest grayscale V255. The multiplexer MUX10 selects and outputs any one of the voltages divided by the voltage divider circuit RS10 according to the voltage control data REG10. A voltage D256' outputted from the multiplexer MUX10 may be linked to a display brightness value (DBV), so that the voltage level thereof may be varied. For example, as the DBV is higher, a voltage close to the low potential reference voltage VRL is outputted from the multiplexer MUX10. The DBV is luminance setting data for varying luminance according to an illuminance sensor output signal of the host system 200 or a luminance input value of a user. The host system 200 or the timing controller 130 may vary the voltage control data REG10 in association with the DBV. The output voltage of the multiplexer MUX10 may be selected in a voltage range of higher grayscale than the highest grayscale voltage V255. Accordingly, in the fingerprint recognition mode, pixels used as a light source in the third area SA may emit light with a luminance higher than that of pixels in the first and second areas DA and CA.

The multiplexer MUX20 selects any one of a separate light source driving voltage D256 set independently of the DBV and a DBV interlocking voltage D256' outputted from the multiplexer MUX10 under the control of the host system 200 to output a light source driving voltage V256. The DBV non-interlocking voltage D256 is a voltage preset in a voltage range of a higher grayscale than the highest grayscale voltage V255. The host system 200 may select the output voltage of the multiplexer MUX20 using the enable signal EN in the fingerprint recognition mode.

The grayscale voltage generation unit 151 includes a plurality of voltage divider circuits RS11 to RS17 and a plurality of multiplexers MUX11 to MUX18.

A first-first voltage divider circuit RS11 divides a voltage between the output voltage of a first multiplexer MUX01 and the output voltage of a second multiplexer MUX02. The first-first multiplexer MUX11 selects any one of the voltages divided by the voltage divider circuit RS11 according to the voltage control data REG11. The output voltage of the first-first multiplexer MUX11 is outputted through a buffer and may be a gamma compensation voltage V191 corresponding to the grayscale 191. A first-second voltage divider circuit RS12 divides a voltage between the output voltage of the first-first multiplexer MUX11 and the output voltage of the second multiplexer MUX02. A first-second multiplexer MUX12 selects any one of the voltages divided by the voltage divider circuit RS12 according to the voltage control data REG12. The output voltage of the first-second multiplexer MUX12 is outputted through a buffer and may be a gamma compensation voltage V127 corresponding to the grayscale 127.

The first-third voltage divider circuit RS13 divides a voltage between the output voltage of the first-second multiplexer MUX12 and the output voltage of the second multiplexer MUX02. A first-third multiplexer MUX13 selects any one of the voltages divided by the voltage divider circuit RS13 according to the voltage control data REG13. The output voltage of the first-third multiplexer MUX13 is outputted through a buffer and may be a gamma compensation voltage V63 corresponding to the grayscale 63. A first-fourth voltage divider circuit RS14 divides a voltage between the output voltage of the first-third multiplexer MUX13 and the output voltage of the second multiplexer MUX02. A first-fourth multiplexer MUX14 selects any one of the voltages divided by the voltage divider circuit RS14 according to the voltage control data REG14. The output voltage of the first-fourth multiplexers MUX14 is outputted through a buffer and may be a gamma compensation voltage V31 corresponding to the grayscale 31.

A first-fifth voltage divider circuit RS15 divides a voltage between the output voltage of the first-fourth multiplexer MUX14 and the output voltage of the second multiplexer MUX02. A first-fifth multiplexer MUX15 selects any one of the voltages divided by the voltage divider circuit RS15 according to the voltage control data REG15. The output voltage of the first-fifth multiplexer MUX15 is outputted through a buffer and may be a gamma compensation voltage V15 corresponding to the grayscale 15. A first-sixth voltage divider circuit RS16 divides a voltage between the output voltage of the first-fifth multiplexer MUX15 and the output voltage of the second multiplexer MUX02. The first-sixth multiplexer MUX16 selects any one of the voltages divided by the voltage divider circuit RS16 according to the voltage control data REG16. The output voltage of the first-sixth multiplexer MUX16 is outputted through a buffer and may be a gamma compensation voltage V7 corresponding to the grayscale 7.

A first-seventh voltage divider circuit RS17 divides a voltage between the output voltage of the first-sixth multiplexer MUX16 and the output voltage of the second multiplexer MUX02. A first-seventh multiplexer MUX17 selects any one of the voltages divided by the voltage divider circuit RS17 according to the voltage control data REG17. The output voltage of the first-seventh multiplexer MUX17 is outputted through a buffer and may be a gamma compensation voltage V4 corresponding to the grayscale 4. A first-eighth multiplexer MUX18 selects any one of the voltages divided by the voltage divider circuit RS17 according to the voltage control data REG18. The output voltage of the first-eighth multiplexer MUX18 is outputted through a buffer and may be a gamma compensation voltage V1 corresponding to the grayscale 1.

The grayscale voltage generation unit 151 further includes a plurality of voltage divider circuits RS21 to RS28. A second-first voltage divider circuit RS21 divides a voltage between the highest gamma compensation voltage V255 and the voltage V191 of the grayscale 191 to output a gamma compensation voltage between the highest grayscale and the grayscale 191. A second-second voltage divider circuit RS22 divides a voltage between the voltage V191 of the grayscale 191 and the voltage V127 of the grayscale 127 to output a gamma compensation voltage between the grayscale 191 and the grayscale 127. A second-third voltage divider circuit RS23 divides a voltage between the voltage V127 of the grayscale 127 and the voltage V63 of the grayscale 63 to output a gamma compensation voltage between the grayscale 127 and the grayscale 63. A second-fourth voltage divider circuit RS24 divides a voltage between the voltage V63 of the grayscale 63 and the voltage V31 of the grayscale 31 to output a gamma compensation voltage between the grayscale 63 and the grayscale 31. A second-fifth voltage divider circuit RS25 divides a voltage between the voltage V31 of the grayscale 31 and the voltage V15 of the grayscale 15 to output a gamma compensation voltage between the grayscale 31 and the grayscale 15. A second-sixth voltage divider circuit RS26 divides a voltage between the voltage V15 of the grayscale 15 and the voltage V7 of the grayscale 7 to output a gamma compensation voltage between the grayscale 15 and the grayscale 7. A second-seventh voltage divider circuit RS27 divides a voltage between the voltage V7 of the grayscale 7 and the voltage V4 of the grayscale 4 to output a gamma compensation voltage between the grayscale 7 and the grayscale 4. A second-eighth voltage divider circuit RS28 divides a voltage between the voltage V4 of the grayscale 4 and the voltage V1 of the grayscale 1 to output a gamma compensation voltage between the grayscale 4 and the grayscale 1.

The gamma compensation voltage generator 150 may include an R gamma compensation voltage generator, a G gamma compensation voltage generator, and a B gamma compensation voltage generator to obtain an optimum gamma compensation voltage for each color of the sub-pixels. Each of the first and second voltage control data is independently set for each color to select a different voltage from the R gamma compensation voltage generator, the G gamma compensation voltage generator, and the B gamma compensation voltage generator. A gamma compensation voltage outputted from the R gamma compensation voltage generator is a grayscale voltage of a data voltage to be supplied to the R sub-pixel. Gamma compensation voltages V0 to V256 outputted from the G gamma compensation voltage generator are grayscale voltages of a data voltage to be supplied to the G sub-pixel. A gamma compensation voltage outputted from the B gamma compensation voltage generator is a grayscale voltage of a data voltage to be supplied to the B sub-pixel.

The gamma compensation voltages V0 to V255 for each grayscale and the light source driving voltage V256 are inputted to the DAC of the data driver 110. The DAC of the data driver 110 converts the pixel data received from the timing controller 130 into a gamma compensation voltage having a different voltage for each grayscale, and outputs the data voltage Vdata for driving the display. In the fingerprint recognition mode, the data driver 110 converts the light source driving data received from the timing controller 130 into the light source driving voltage V256 and supplies it to the pixels, which are used as a light source, in the third area SA through the data line.

The PPI of the second and third areas CA and SA is lower than that of the first area DA. For this reason, when the pixels of the first area DA and the pixels of the second and third areas CA and SA are driven with the same data voltage at the same grayscale, the luminance of the second and third areas CA and SA may be lowered. In the present disclosure, the first voltage control data is inputted to the gamma compensation voltage generator 150 during the scanning period of the first area DA, and the second voltage data is inputted to the gamma compensation voltage generator 150 during the scanning period of the second and third areas CA and SA, thereby controlling the data voltage applied to the second and third areas CA and SA in a dynamic range greater than that of the data voltage applied to the first area DA. In the present disclosure, the dynamic range of the data voltage may be independently controlled for each area of the pixel array using one programmable gamma IC. Accordingly, in the present disclosure, the luminance of the second and third areas CA and SA having low PPI is increased, so that the luminance difference between the areas of the pixel array DA. CA, and SA is not visually recognized, thereby realizing uniform luminance over the entire screen.

Figure 16:
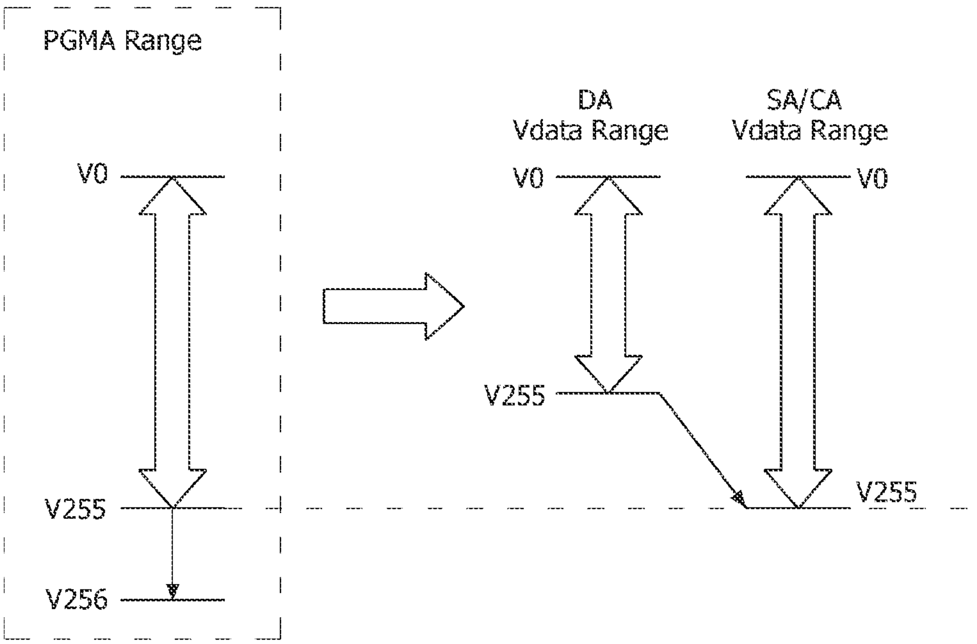
FIG. 16 is a diagram illustrating a gamma compensation voltage outputted from a gamma compensation voltage generator and a data voltage for each area.

FIG. 16 is a diagram illustrating a gamma compensation voltage outputted from a gamma compensation voltage generator and a data voltage for each area. In FIG. 16, "PGMA Range" indicates a gamma compensation voltage outputted from the gamma compensation voltage generator 150. As shown in FIG. 16, the dynamic range of the data voltage Vdata applied to the second and third areas CA and SA of low PPI is greater than the data voltage range applied to the first area DA of high PPI. In particular, since the dynamic range of the data voltage Vdata is large in the high grayscale, the pixel luminance of low PPI may be increased compared to the pixel luminance of the high PPI.

Figure 17:
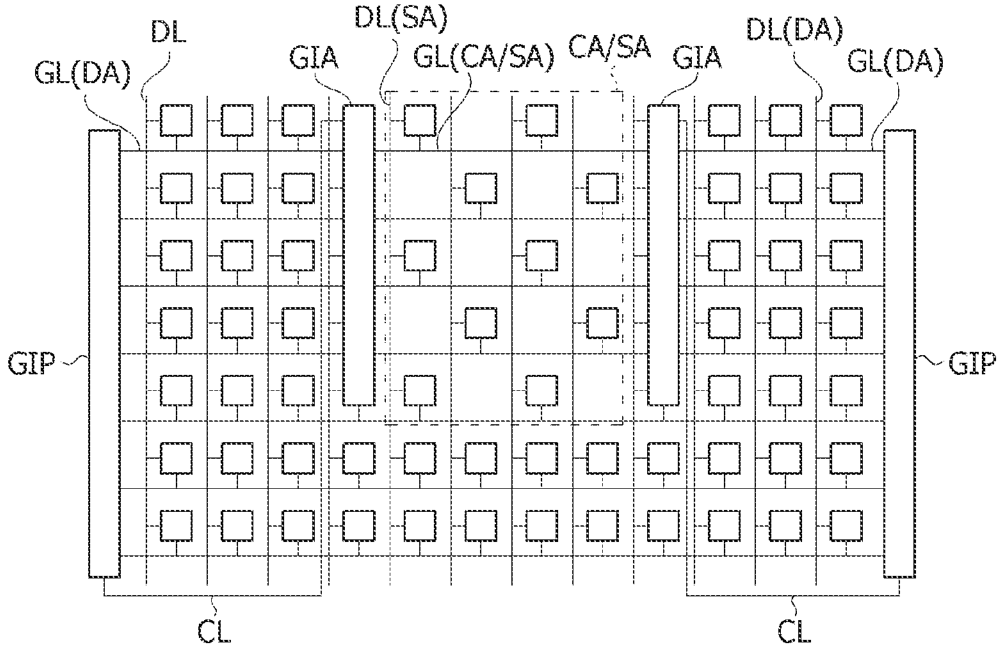
FIG. 17 is a diagram illustrating gate lines and gate drivers separated for each area of a pixel array.

FIG. 17 is a diagram illustrating gate lines and gate drivers separated for each area of the pixel array DA, CA, and SA. In FIG. 17, "GIP" denotes the first gate driver 120 disposed in the bezel area BZ outside the pixel array DA, CA, and SA. "GIA" indicates at least a part of the second gate driver 123 and/or the third gate driver 124 disposed in the pixel array DA, CA, and SA.

Referring to FIG. 17, the gate lines GL(DA) and GL(CA/SA) are separated between the first area DA of high PPI and the second and third areas CA and SA of low PPI. The data lines DL are connected without being separated between the areas DA, CA, and SA.

The gate driver GIP is connected to the gate lines GL(DA) during the scanning period of the first area DA and sequentially applies a gate signal to the gate lines GL(DA). The $n^{th}$ (n being a natural number) signal transmission unit of the gate driver GIP applies a gate signal to the gate lines connected to an $n^{th}$ pixel line, and supplies a carry signal to an $(n+1)^{th}$ signal transmission unit of the gate driver GIA disposed in the pixel array DA, CA, and SA. To this end, the gate drivers GIP and GIA are connected to a gate control line CL. The gate control line CL includes a carry line to which the carry signal CAR is applied, and a clock line to which the shift clock CLK1 to CLK4 is applied.

During the scanning period of the second area CA or the third area SA, the gate driver GIA disposed in the pixel array DA. CA, and SA is connected to the gate lines GL(CA/SA) and sequentially applies a gate signal to the gate lines GL(CA/SA). At least a part of the gate control line CL connected to the signal transmission units of the gate driver GIA is disposed in the pixel array DA, CA, and SA. The gate control line CL in the pixel array DA, CA, and SA may overlap the signal lines DL and GL or the power lines PL1 and PL2 in the pixel array DA, CA, and SA. As one example, at least a part of the carry line is formed in the pixel array DA, CA, and SA as a wire parallel to the data line DL. VDD line PL1, and Vini line PL2, and overlaps the lines DL, PL1, and PL2.

Figure 18:
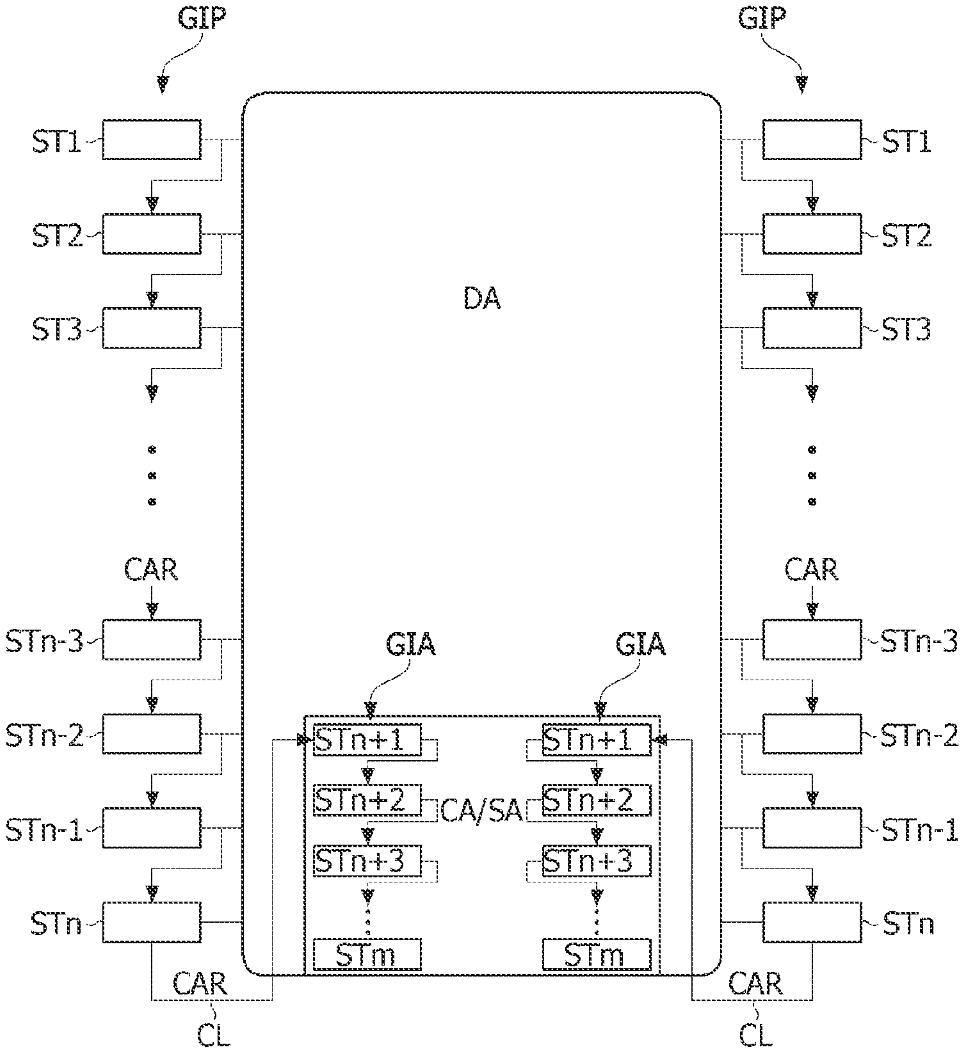
FIGS. 18 and 19 are diagrams illustrating a carry signal transmission path between gate drivers.

FIGS. 18 and 19 are diagrams showing a carry signal transmission path between gate drivers. In FIGS. 18 and 19, "ST1 to STm" are signal transmission units. In FIGS. 18 and 19, the third area SA is omitted, but the second area CA may be interpreted as the third area SA.

Referring to FIG. 18, the second area CA may be disposed at a position close to a pixel line of the first area DA where scanning is finished. For example, the second area CA may be disposed at the top or bottom of the pixel array DA. CA, and SA.

The first gate driver GIP may include first to $n^{th}$ (n being a natural number) signal transmission units ST1 to STn connected to the gate lines of the first area DA. The first gate driver GIP sequentially supplies a gate signal to the gate lines of the first area DA to sequentially scan the pixels in the first area DA on one pixel line basis.

The second gate driver GIA may include $(n+1)^{th}$ to $m^{th}$ (m being a natural number greater than n) signal transmission units STn+1 to STm connected to the gate lines of the second area CA The $(n+1)^{th}$ signal transmission unit STn+1 receives the carry signal CAR from the first gate driver GIP.

The second gate driver GIA starts to be driven when the carry signal is inputted from the first gate driver GIP, and sequentially supplies a gate signal to the gate lines of the second area CA to sequentially scan the pixels in the second area CA on one pixel line basis.

Referring to FIG. 19, the second area CA may be disposed in a middle portion of the pixel array DA, CA, and SA.

The first gate driver GIP may include the first to $n^{th}$ signal transmission units ST1 to STn connected to the gate lines of the first area DA, and $(m+1)^{th}$ to $(m+4)^{th}$ signal transmission units STm+1 to STm+4. The first to $n^{th}$ signal transmission units ST1 to STn sequentially supply gate signals to the gate lines connected to first to $n^{th}$ pixel lines in the first area DA. The $n^{th}$ signal transmission unit STn may supply the carry signal CAR to the $(n+1)^{th}$ signal transmission unit STn+1, which is the first signal transmission unit of the second gate driver GIA. The $(m+1)^{th}$ signal transmission unit STm+1 may receive the carry signal CAR from the $m^{th}$ signal transmission unit STm, which is the last signal transmission unit of the second gate driver GIA. After the carry signal CAR is inputted to the $(m+1)^{th}$ signal transmission unit STm+1, the $(m+1)^{th}$ to $(m+4)^{th}$ signal transmission units STm+1 to STm+4 sequentially supply gate signals to the gate lines connected to the $(m+1)^{th}$ to $(m+4)^{th}$ pixel lines of the first area DA.

The second gate driver GIA may include the $(n+1)^{th}$ to $m^{th}$ signal transmission units STn+1 to STm connected to the gate lines of the second area CA. The $(n+1)^{th}$ signal transmission unit STn+1 receives the carry signal CAR from the $n^{th}$ signal transmission unit STn of the first gate driver GIP. After the carry signal CAR is inputted to the (n+1)th signal transmission unit STn+1, the $(n+1)^{th}$ to $m^{th}$ signal transmission units STn+1 to STm sequentially supply gate signals to the gate lines connected to the pixel lines of the second area CA.

Figure 20:
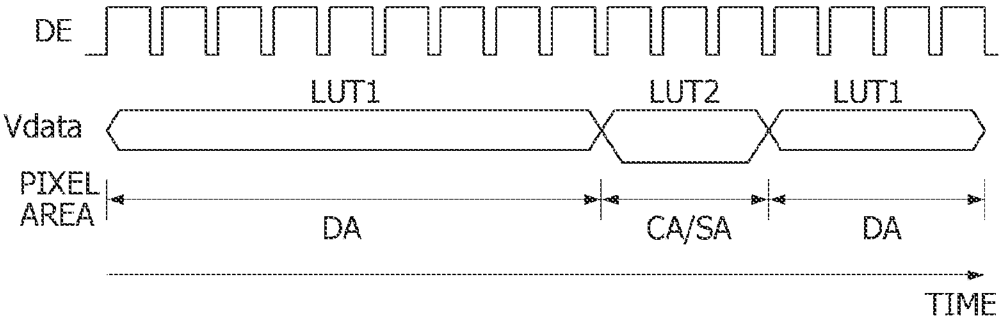
FIG. 20 is a diagram illustrating a scanning period for each area of a pixel array and look-up table data selected according to the scanning period.

FIG. 20 is a diagram illustrating a scanning period for each area of a pixel array and look-up table data selected according to the scanning period.

Referring to FIG. 20, during the scanning period of the first area DA, the first voltage control data registered in the first look-up table LUT1 is selected. Accordingly, during the scanning period of the first area DA, the data voltage Vdata having a relatively small dynamic range as shown in FIG. 16 is applied to the pixels of the first area DA.

During the scanning period of the second area CA or the third area SA, the second voltage control data registered in the second look-up table LUT2 is selected. Accordingly, during the scanning period of the second area CA or the third area SA, the data voltage Vdata having a relatively large dynamic range as shown in FIG. 16 is applied to the pixels of the second area CA or the third area SA.

The gate driver that drives the gate lines of the second and third areas CA and SA is partially disposed in the pixel array DA, CA, and SA, so that a part of the gate signal may be applied to the gate lines in the pixel array. In another embodiment, the gate driver that drives the gate lines of the low PPI area CA and SA is disposed in the pixel array DA, CA, and SA to apply a gate signal to the gate lines in the pixel array DA, CA, and SA.

Each of the pixel circuits of the high PPI area DA and the low PPI area CA and SA may receive a first scan pulse, a second scan pulse, and an EM pulse as shown in FIG. 9. In this case, the gate driver, e.g., the second gate driver, for driving the gate lines of the low PPI area CA and SA may include a second-first gate driver that outputs a first scan pulse, a second-second gate driver that outputs a second scan pulse, and a second-third gate driver that outputs an EM control pulse. At least one of the second-first gate driver, the second-second gate driver, and the second-third gate driver may be disposed in the pixel array DA, CA, and SA as shown in FIGS. 21 to 26.

Figure 21:
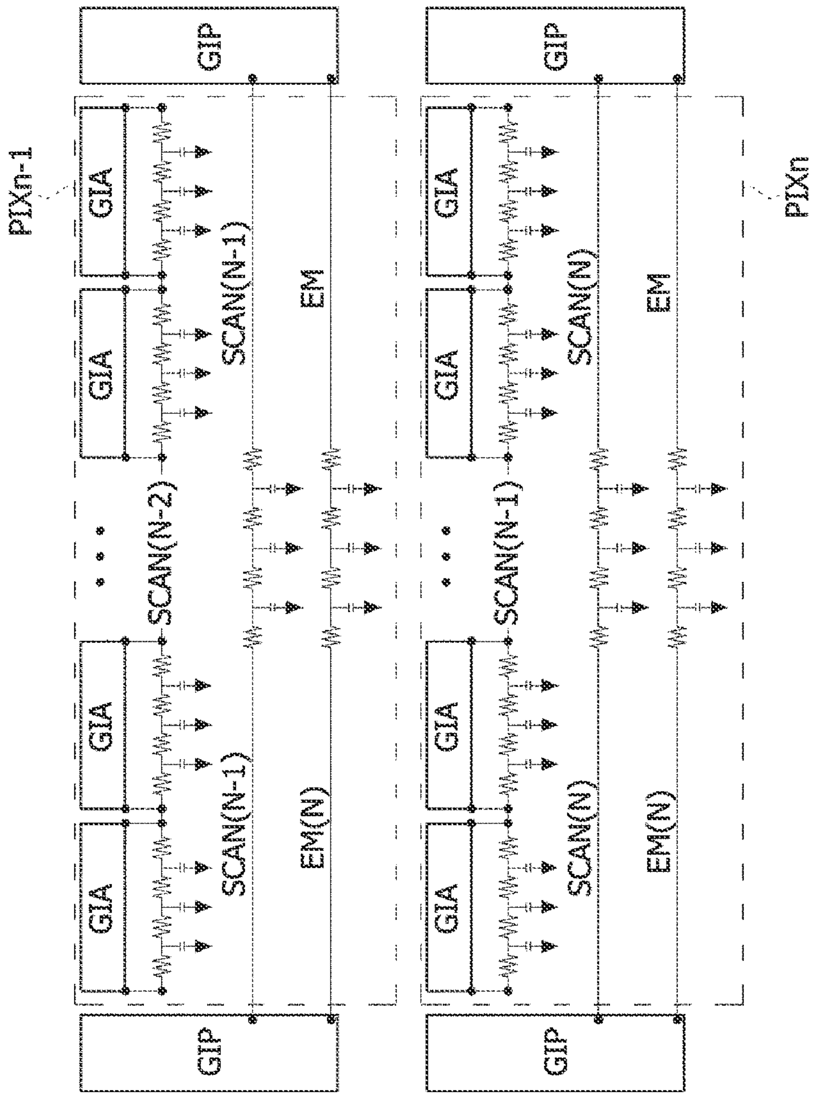
FIGS. 21 to 26 are diagrams showing various connection structures of gate drivers that drive gate lines in a low PPI area.
Figure 22:
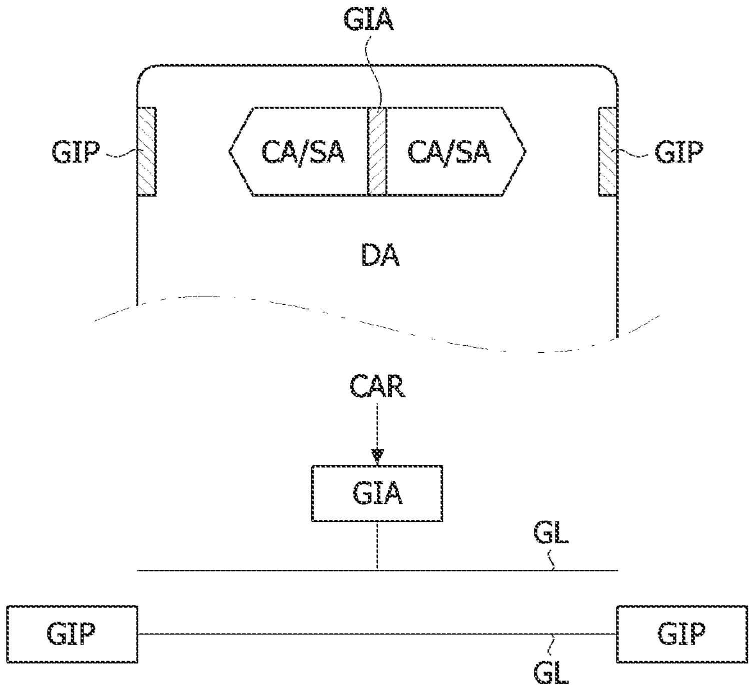

FIGS. 21 to 26 are diagrams illustrating various connection structures of gate drivers that drive gate lines of a low PPI area. The gate driver shown in FIGS. 21 to 26 is the second gate driver or the third gate driver for driving the gate lines GL of the low PPI area CA and SA. In FIGS. 21 and 22, "PIXn−1" and "PIXn" are pixel lines in the second area CA or the third area SA.

Referring to FIGS. 21 and 22, the gate driver may include a GIA circuit GIA disposed in the pixel array DA, CA, and SA, and a GIP circuit GIP disposed in the bezel area outside the pixel array DA, CA, and SA. The GIA circuit GIA and the GIP circuit GIP include a signal transmission unit.

An $(n-1)^{th}$ GIP circuit GIP applies the $(N-1)^{th}$ scan pulse SCAN(N−1) to the (N−1)th scan line of an (n−1)th pixel line PIXn−1, and applies the EM pulse EM(N) to an $N^{th}$ EM line. An $(n-1)^{th}$ GIA circuit GIA applies an $(N-2)^{th}$ scan pulse SCAN(N−2) to an $(N-2)^{th}$ scan line of the $(n-1)^{th}$ pixel line PIXn−1.

An $n^{th}$ GIP circuit GIP applies the $N^{th}$ scan pulse SCAN (N) to the $N^{th}$ scan line of an $n^{th}$ pixel line PIXn, and applies the EM pulse EM(N) to the $N^{th}$ EM line. An $n^{th}$ GIA circuit GIA applies the $(N-1)^{th}$ scan pulse SCAN(N−1) to the $(N-1)^{th}$ scan line of the $n^{th}$ pixel line PIXn.

Referring to FIGS. 23 to 26, in this embodiment, the gate driver for driving the gate lines of the low PPI area CA and SA is configured only with the GIA circuit without the GIP circuit. The GIA circuit GIA includes a signal transmission unit. The GIA circuit GIA applies the gate signals SCAN (N−2) to SCAN(N) and EM(N) to the gate lines of the pixel lines PIXn−1 and PIXn.

Figure 23:
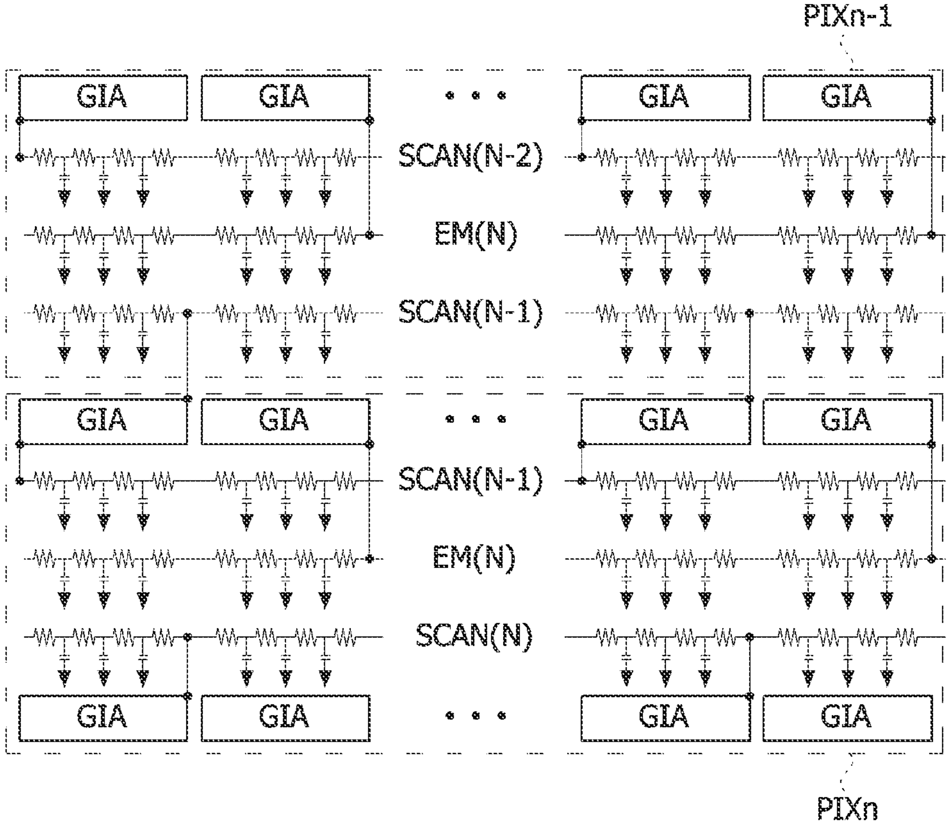
Figure 24:
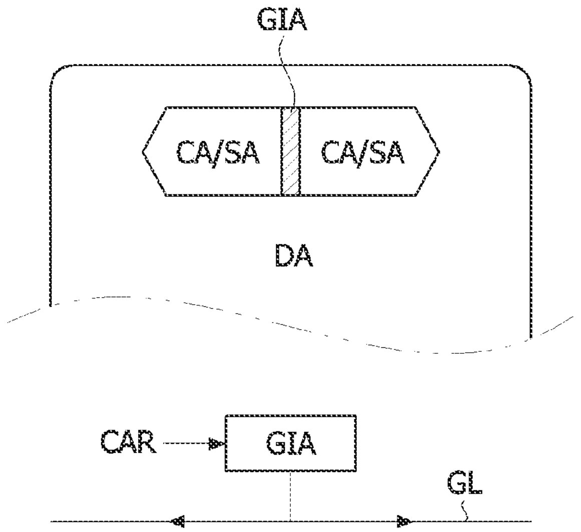
Figure 25:
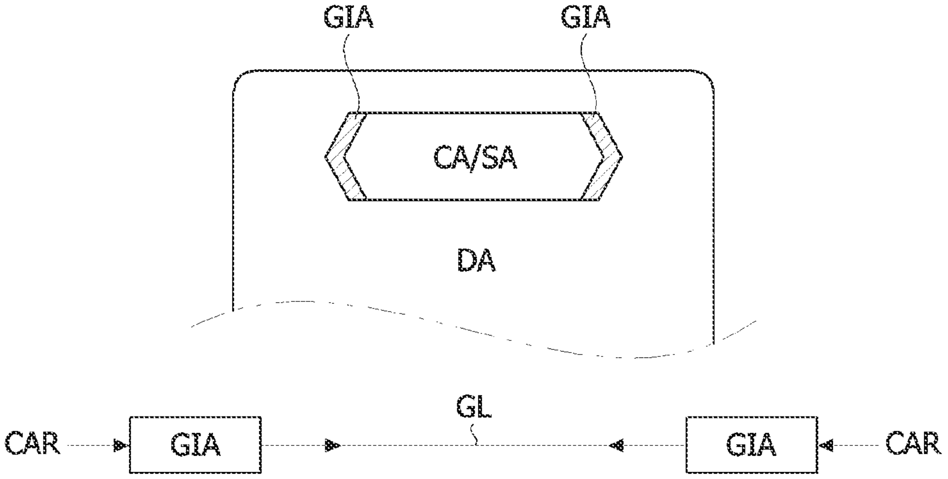
Figure 26:
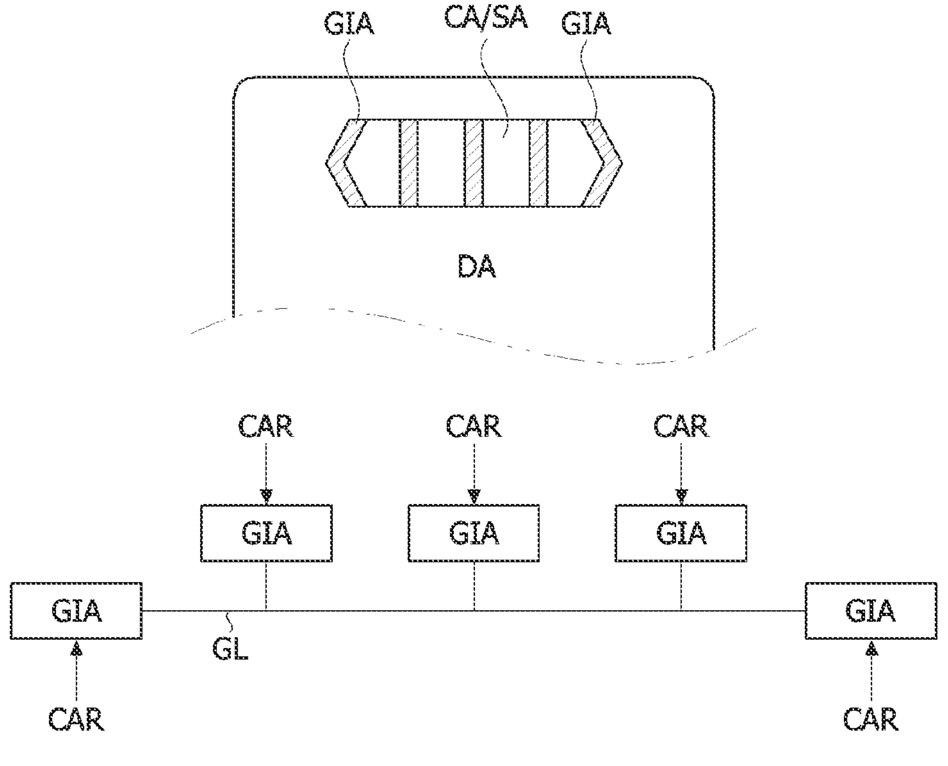

As shown in FIGS. 22 and 23, the GIA circuit GIA is positioned in the center of the gate line GL of the low PPI area CA and SA and applies a gate signal to the gate line GL in a single feeding method, but the present disclosure is not limited thereto. For example, two GIA circuits GIA are connected to both ends of the gate line of the low PPI area CA and SA, and as shown in FIG. 25, simultaneously apply a gate signal at both sides of the gate line GL using a double feeding method. In addition, three or more GIA circuits GIA are connected to both sides and the center of the gate line of the low PPI area CA and SA, and as shown in FIG. 26, simultaneously apply a gate signal at multiple points of the gate lines GL using a double feeding method, thereby compensating for RC delay of the gate signal.

The gate driver of the present disclosure may be applied not only to pixel arrays having partially different resolution or PPI, but also to pixel arrays having no resolution or PPI distinction. For example, the display panel includes a first gate driver configured to supply a gate signal to gate lines connected to pixels disposed in a first area of the pixel array, and a second gate driver configured to receive a carry signal from the first gate driver and supply a gate signal to gate lines connected to pixels disposed in a second area of the pixel array. The second gate driver includes a signal transmission unit disposed in the pixel array to receive the carry signal from the first gate driver.

The objects to be achieved by the present disclosure, the means for achieving the objects, and effects of the present disclosure described above do not specify essential features of the claims, and thus, the scope of the claims is not limited to the disclosure of the present disclosure.

It will be apparent to those skilled in the art that various modifications and variations can be made in the display panel and the display device using the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display panel, comprising:

a pixel array in which a plurality of data lines, a plurality of gate lines crossing the data lines, and a plurality of pixels are disposed, wherein the pixel array includes:

a first pixel area;

a second pixel area in which an optical sensor is disposed;

a third pixel area disposed to be spaced apart from the second pixel area to sense a fingerprint, wherein:

each of the pixels of the first pixel area, the second pixel area and the third pixel area includes sub-pixels having a pixel circuit;

the second pixel area includes a plurality of light transmitting portions;

the third pixel area includes a plurality of photo sensors; and a resolution or pixels per inch (PPI) of each of the second pixel area and the third pixel area is lower than that of the first pixel area.

2. The display panel of claim 1, further comprising:

a first gate driver configured to supply a gate signal to gate lines connected to pixels disposed in the first pixel area; and a second gate driver configured to receive a carry signal from the first gate driver and supply a gate signal to gate lines connected to pixels disposed in at least one of the second pixel area and the third pixel area.

3. The display panel of claim 2, wherein the second gate driver includes a first stage disposed in the pixel array to receive the carry signal from the first gate driver.

4. The display panel of claim 3, wherein the first gate driver includes a plurality of third stages disposed in a bezel area outside the pixel array to sequentially supply the gate signal to the gate lines connected to of the pixels disposed in the first pixel area, and the second gate driver further includes a plurality of second stages dependently connected to the first stage, which receives the carry signal from the first gate driver, to sequentially supply the gate signal to the gate lines connected to the pixels disposed in at least one of the second pixel area and the third pixel area.

5. The display panel of claim 4, further comprising:

a gate control line configured to transmit the carry signal from the first gate driver to the second gate driver, wherein at least a part of the gate control line is disposed in the pixel array.

6. The display panel of claim 4, wherein the first gate driver further includes fourth stages configured to receive a carry signal from the second gate driver and sequentially supply a gate signal to some gate lines connected to some pixels disposed in the first pixel area.

7. The display panel of claim 4, wherein the pixel circuit receives a first scan pulse, a second scan pulse, and a light emission control pulse.

8. The display panel of claim 7, wherein the second gate driver includes:

a second-first gate driver configured to output the first scan pulse;

a second-second gate driver configured to output the second scan pulse; and a second-third gate driver configured to output the light emission control pulse, and at least one of the second-first gate driver, the second-second gate driver, and the second-third gate driver is disposed in the pixel array.

9. The display panel of claim 2, wherein the gate lines connected to the pixels disposed in the second pixel area are separated from the gate lines connected to the pixels disposed in the first pixel area.

10. The display panel of claim 2, wherein the gate lines connected to the pixels disposed in the third pixel area are separated from the gate lines connected to the pixels disposed in the first pixel area.

11. A display device, comprising:

a display panel including a pixel array in which a plurality of data lines, a plurality of gate lines crossing the data lines, and a plurality of pixels are disposed;

a controller configured to output first voltage control data for controlling a dynamic range of a data voltage applied to pixels disposed in a first pixel area of the pixel array during a first scanning period in which the first pixel area is scanned, and output second voltage control data for controlling a dynamic range of a data voltage applied to pixels disposed in a second pixel area and a third pixel area of the pixel array during a second scanning period in which the second pixel area is scanned, and a third scanning period in which the third pixel area is scanned;

a gamma compensation voltage generator configured to output a first gamma compensation voltage in response to the first voltage control data during the first scanning period of the first pixel area, and output a second gamma compensation voltage in response to the second voltage control data during the second scanning period of the second pixel area and the third scanning period of the third pixel area;

a data driver configured to, during the first scanning period, convert pixel data into the first gamma compensation voltage to output a data voltage to be supplied to the pixels disposed in the first pixel area, and during the second scanning period and the third scanning period, convert pixel data into the second gamma compensation voltage to output a data voltage to be supplied to the pixels disposed in the second pixel area and the third pixel area, wherein:

an optical sensor is configured to be disposed in the second pixel area, and the third pixel area is configured to be spaced apart from the second pixel area to sense a fingerprint;

wherein a resolution or pixels per inch (PPI) of each of the second pixel area and the third pixel area is lower than that of the first pixel area.

12. The display device of claim 11, further comprising:

a first gate driver configured to supply a gate signal to gate lines connected to the pixels disposed in the first pixel area; and a second gate driver configured to receive a carry signal from the first gate driver and supply a gate signal to gate lines connected to the pixels disposed in at least one of the second pixel area and the third pixel area.

13. The display device of claim 12, wherein the first gate driver includes a plurality of third stages disposed in a bezel area outside the pixel array to sequentially supply the gate signal to the gate lines connected to the pixels disposed in the first pixel area, and the second gate driver disposed in the pixel array includes a plurality of second stages dependently connected to a first stage, which receives the carry signal from the first gate driver, to sequentially supply the gate signal to the gate lines connected to the pixels disposed in at least one of the second pixel area and the third pixel area.

14. The display device of claim 11, wherein a dynamic range of a data voltage applied to the pixels of at least one of the second pixel area and the third pixel area is greater than a dynamic range of a data voltage applied to the pixels of the first pixel area.

15. The display device of claim 11, wherein the controller includes:

an area determination circuit configured to receive the pixel data and a timing signal synchronized with the pixel data and determine an area of the pixel array in which the pixel data is displayed;

a first look-up table in which the first voltage control data has been set;

a second look-up table in which the second voltage control data has been set; and a multiplexer configured to select the first voltage control data during the first scanning period and select the second voltage control data during the second scanning period and the third scanning period, under the control of the area determination circuit.

16. The display device of claim 15, wherein the gamma compensation voltage generator includes a plurality of multiplexers that select one of divided voltages in response to the first voltage control data during the first scanning period, and select one of the divided voltages in response to the second voltage control data during the second scanning period and the third scanning period.

17. The display device of claim 11, wherein the second pixel area includes a plurality of light transmitting portions, and wherein the display device further comprises a sensor module disposed in a lower portion of a rear surface of the display panel to face the second pixel area.

18. The display device of claim 11, wherein the third pixel area includes a plurality of photo sensors.

* * * * *